US007266512B2

(12) United States Patent
Cohn et al.

(10) Patent No.: US 7,266,512 B2
(45) Date of Patent: Sep. 4, 2007

(54) SYSTEM AND METHOD FOR ESTABLISHING BUSINESS TO BUSINESS CONNECTIONS VIA THE INTERNET

(75) Inventors: Steven M. Cohn, Holliston, MA (US); Frank M. Hertz, Boston, MA (US); Scott S. Cohen, Newton Centre, MA (US); John Potter, Westford, MA (US)

(73) Assignee: CNET Networks, Inc., San Francisco, CA (US)

( * ) Notice: Subject to any disclaimer, the term of this patent is extended or adjusted under 35 U.S.C. 154(b) by 326 days.

(21) Appl. No.: 09/903,257

(22) Filed: Jul. 11, 2001

(65) Prior Publication Data

US 2002/0010651 A1  Jan. 24, 2002

Related U.S. Application Data

(60) Provisional application No. 60/219,101, filed on Jul. 18, 2000.

(51) Int. Cl.
*G06Q 30/00* (2006.01)

(52) U.S. Cl. .................. 705/26; 705/27; 709/218; 715/513; 715/834

(58) Field of Classification Search .................. 705/26, 705/27, 10, 7; 709/217, 218; 715/513, 854, 715/834
See application file for complete search history.

(56) References Cited

U.S. PATENT DOCUMENTS

| 5,592,375 A | * | 1/1997 | Salmon et al. .................. 705/7 |
| 5,794,230 A | * | 8/1998 | Horadan et al. ................ 707/2 |
| 5,852,810 A | * | 12/1998 | Sotiroff et al. ................ 705/27 |
| 5,930,474 A | * | 7/1999 | Dunworth et al. .......... 709/217 |
| 5,944,769 A | * | 8/1999 | Musk et al. ................ 701/201 |
| 6,000,030 A | * | 12/1999 | Steinberg et al. ........... 713/200 |
| 6,026,433 A | * | 2/2000 | D'Arlach et al. ........... 709/217 |
| 6,038,597 A | | 3/2000 | Van Wyngarden .......... 709/219 |
| 6,055,503 A | * | 4/2000 | Horstmann ..................... 705/1 |
| 6,061,057 A | | 5/2000 | Knowlton et al. .......... 345/335 |
| 6,115,690 A | | 9/2000 | Wong ............................. 705/7 |
| 6,119,078 A | | 9/2000 | Kobayakawa et al. ......... 704/3 |
| 6,131,087 A | | 10/2000 | Luke et al. ................... 705/26 |
| 6,141,653 A | * | 10/2000 | Conklin et al. ............... 705/80 |
| 6,141,666 A | * | 10/2000 | Tobin ......................... 715/513 |
| 6,253,208 B1 | * | 6/2001 | Wittgreffe et al. ........ 707/104.1 |
| 6,260,024 B1 | * | 7/2001 | Shkedy ........................ 705/37 |

(Continued)

FOREIGN PATENT DOCUMENTS

WO   WO94/23383   * 10/1994

OTHER PUBLICATIONS

"About.com Adds Auction-Based Advertising to Platform", PR Newswire; Apr. 10, 2000, p. 1.*

*Primary Examiner*—F. Zeender
*Assistant Examiner*—M. Thein
(74) *Attorney, Agent, or Firm*—Marc S. Kaufman; Carlos Villamar; Nixon Peabody LLP

(57) ABSTRACT

A comprehensive and searchable network of on-line directories of service providers and a method for a user to use this network is disclosed. The network enables a user to obtain or market products and services on the Internet. The system includes the following software architecture and system design components: Network Data Sharing, Geographic Radius Searching, and Partner Web Site Branding.

3 Claims, 46 Drawing Sheets

U.S. PATENT DOCUMENTS

| | | | |
|---|---|---|---|
| 6,493,677 B1 * | 12/2002 | von Rosen et al. | 705/27 |
| 6,546,400 B1 * | 4/2003 | Aberson | 707/104.1 |
| 6,578,010 B1 * | 6/2003 | Teacherson | 705/14 |
| 6,629,135 B1 * | 9/2003 | Ross et al. | 709/218 |
| 6,965,868 B1 * | 11/2005 | Bednarek | 705/9 |
| 6,968,513 B1 * | 11/2005 | Rinebold et al. | 715/854 |
| 7,058,704 B1 * | 6/2006 | Mangipudi et al. | 709/223 |
| 2001/0054068 A1 * | 12/2001 | Modiano | 709/203 |

* cited by examiner

Partner table 41

| partnerID | partnerName |
|---|---|
| 1 | Partner-A |
| 2 | Partner-B |
| 3 | Partner-C |
| 4 | Partner-D |

PartnerSharing table 42

| partnerID | partnerRefID | sharingID | isPushed |
|---|---|---|---|
| 1 | 0 | 1 | 1 |
| 1 | 0 | 2 | 1 |
| 2 | 0 | 2 | 1 |
| 3 | 0 | 2 | 1 |
| 3 | 4 | 1 | 1 |
| 4 | 0 | 2 | 1 |
| 4 | 3 | 1 | 1 | refID 0 is a wildcard, sharingID 1 shares Companies, sharingID 2 shares RFPs

Industry table 43

| industryID | name |
|---|---|
| 1 | IT Services |

Category table 44

| industryID | categoryID | description |
|---|---|---|
| 1 | 1 | Co-location |
| 1 | 2 | Hardware |
| 1 | 3 | Networking |
| 1 | 4 | Training/Education |
| 1 | 5 | Web Authoring |
| 1 | 6 | Web Development |

PartnerCategory table 45

| industryID | partnerID | categoryID | topID | subID |
|---|---|---|---|---|
| 1 | 1 | 1 | 1 | 0 |
| 1 | 1 | 2 | 1 | 1 |
| 1 | 1 | 3 | 1 | 2 |
| 1 | 1 | 4 | 2 | 0 |
| 1 | 1 | 5 | 2 | 1 |
| 1 | 1 | 6 | 2 | 2 |
| 2 | 1 | 1 | 1 | 0 |
| 2 | 1 | 2 | 1 | 1 |
| 2 | 1 | 3 | 1 | 2 |
| 2 | 1 | 4 | 2 | 0 |
| 2 | 1 | 5 | 2 | 1 |
| 2 | 1 | 6 | 2 | 2 |
| 3 | 1 | 1 | 1 | 0 |
| 3 | 1 | 2 | 1 | 1 |
| 3 | 1 | 3 | 1 | 2 |
| 4 | 1 | 1 | 1 | 0 |
| 4 | 1 | 2 | 1 | 1 |
| 4 | 1 | 3 | 1 | 2 |

Company Sharing Matrix 46 — subscribers

| publishers | PartnerA | PartnerB | PartnerC | PartnerD |
|---|---|---|---|---|
| PartnerA |  | 1 | 2 | 2 |
| PartnerB | - |  | - | - |
| PartnerC | - | - |  | 2 |
| PartnerD | - | - | 2 |  |

1 - all companies in all categories are pushed
2 - all companies in categories 1, 2, and 3 are pushed

RFP Sharing Matrix 47 — subscribers

| publishers | PartnerA | PartnerB | PartnerC | PartnerD |
|---|---|---|---|---|
| PartnerA |  | 1 | 2 | 2 |
| PartnerB | 1 |  | 2 | 2 |
| PartnerC | 2 | 2 |  | 2 |
| PartnerD | 2 | 2 | 2 |  |

1 - all RFPs pushed
2 - all RFPs in categories 1, 2, and 3 are pushed

FIG. 4

Given 1: company and package configuration

Company (51)

| companyID | name |
|---|---|
| 1 | Company-A |
| 2 | Company-B |
| 3 | Company-C |

Package table (52)

| packageID | partnerID | packageName | isBase | cost |
|---|---|---|---|---|
| 1 | 1 | Package-1A | 1 | $0 |
| 2 | 1 | Package-1B | 0 | $99.99 |
| 3 | 2 | Package-2A | 1 | $0 |
| 4 | 2 | Package-2B | 0 | $99.99 |
| 5 | 3 | Package-3A | 1 | $0 |
| 6 | 3 | Package-3B | 0 | $99.99 |
| 7 | 4 | Package-4A | 1 | $0 |
| 8 | 4 | Package-4B | 0 | $99.99 |

Given 2: subscription activity (53)

- Company-A purchases Package-1B on Partner-A in category 1, Co-Location
- Company-B purchases Package-1B on Partner-A in category 4, Training/Education
- Sales agent sells multi-pack to Company-C on Partner-B/Package-2B and Partner-C/Package-3B in category 4, Training/Education

Result: including SSP and DSE

CompanyCategory table (54)

| partnerID | companyID | categoryID | topID | subID | isPrimary |
|---|---|---|---|---|---|
| 1 | 1 | 1 | 1 | 0 | 1 |
| 1 | 1 | 2 | 1 | 1 | 0 |
| 1 | 1 | 3 | 1 | 2 | 0 |
| 2 | 1 | 1 | 1 | 0 | 1 |
| 2 | 1 | 2 | 1 | 1 | 0 |
| 2 | 1 | 3 | 1 | 2 | 0 |
| 1 | 2 | 4 | 2 | 0 | 1 |
| 1 | 2 | 5 | 2 | 1 | 0 |
| 1 | 2 | 6 | 2 | 2 | 0 |
| 2 | 2 | 4 | 2 | 0 | 1 |
| 2 | 2 | 5 | 2 | 1 | 0 |
| 2 | 2 | 6 | 2 | 2 | 0 |
| 3 | 2 | 4 | 2 | 0 | 1 |
| 3 | 2 | 5 | 2 | 1 | 0 |
| 3 | 2 | 6 | 2 | 2 | 0 |
| 4 | 2 | 4 | 2 | 0 | 1 |
| 4 | 2 | 5 | 2 | 1 | 0 |
| 4 | 2 | 6 | 2 | 2 | 0 |
| 2 | 3 | 4 | 2 | 0 | 1 |
| 2 | 3 | 5 | 2 | 1 | 0 |
| 2 | 3 | 6 | 2 | 2 | 0 |
| 3 | 3 | 4 | 2 | 0 | 1 |
| 3 | 3 | 5 | 2 | 1 | 0 |
| 3 | 3 | 6 | 2 | 2 | 0 |
| 4 | 3 | 4 | 2 | 0 | 1 |
| 4 | 3 | 5 | 2 | 1 | 0 |
| 4 | 3 | 6 | 2 | 2 | 0 |

MultiPack table (55)

| multiPackID | companyID |
|---|---|
| 1 | 1 |
| 2 | 1 |
| 3 | 2 |
| 4 | 2 |
| 5 | 2 |
| 6 | 2 |
| 7 | 3 |
| 8 | 3 |

CompanyAffiliation table (56)

| partnerID | companyID | multiPackID | packageID |
|---|---|---|---|
| 1 | 1 | *1 | 2 |
| 2 | 1 | 2 | 3 |
| 1 | 2 | *3 | 2 |
| 2 | 2 | 4 | 3 |
| 3 | 2 | 5 | 5 |
| 4 | 2 | 6 | 7 |
| 2 | 3 | *7 | 2 |
| 3 | 3 | *7 | 4 |
| 4 | 3 | 8 | 5 |

FIG. 7

Building your RFP

The primary category is ASP.
This RFP will be posted anonymously.

TARGET YOUR RFP

What type of vendor are you looking for? You'll be able to get more specific on the next page. For now, simply pick a primary category.

For definitions, click on the category name.

- ○ Accounting
- ○ Advertising
- ○ Consulting
- ○ Financial services
- ○ Hardware
- ○ HR
- ○ Insurance
- ○ ISP
- ○ IT Services
- ○ Legal
- ○ Network services

- ○ Non-Internet
- ○ Public relations
- ○ Real Estate
- ○ Shipping
- ○ Software
- ○ Telecom.
- ○ Training/Ed.
- ○ Web content
- ○ Web hosting
- ◉ Web develop.

[Continue >>] [Cancel]

FIG. 9A

Building your RFP

The primary category is Web develop..
This RFP will be posted anonymously.

GET MORE SPECIFIC

You chose to target your RFP to companies in the category: Web develop..

The following "specialties" exist in that category. Choose any/all that apply.

[choose all] [clear all]

Web develop. specialties: /83
- ☑ Custom programming/apps
- ☑ Database Management
- ☑ Ecommerce
- ☑ Full Service Agency
- ☑ Graphic design
- ☑ Intranet/Extranet
- ☑ Systems integration
- ☑ Web site maintenance 84— [Continue >>] [<< Back] [Cancel]

FIG. 9B

RFP Basics

The primary category is Web develop..
This RFP will be posted anonymously.

TITLE OF MY RFP

[Store front implementation, IIS and ASP] ⟵ 85
(e.g. "Intranet Development" or "Legal Services")

DESCRIPTION

We are a large bicycle chain and would
like to start an online store front to
sell our bicycles. We need an e-
commerce solution that will run on IIS
using ASP.   ⟵ 86

LOCATION

Closest zip or postal code to where this RFP must be filled.

○ Any Zip Code    ● In [02458]    (Zip Code) ⟵ 87
In [United States]

RFP EXPIRATION

I'm looking to fill this RFP:

● Within the next 30 Days (Default value) ⟵ 88
○ Within [    ] [Days]

BUDGET

My budget range is:

[under 10,000] USD ($) ⟵ 89

PAYMENT

I'll pay vendors using:

● Cash      ⟵ 90
○ Equity
○ Combo/Other

SHORT COMPANY DESCRIPTION

Since your RFP will be posted anonymously, it may help potential vendors to know a little bit about you.

If you choose, you may include a short description here.

(If you've posted anonymous RFPs before, the description you've most recently used is included.)

[                    ] ⟵ 91

NOTIFICATION

In addition to updating your left-hand toolbar every time a vendor responds to your RFP, we can also send you email.

Select an email option:

○ Don't notify me, I'll come in and check regularly ⟵ 92
● Email me every response
○ Email me every 5 responses 93 ⟵ [Continue >>] [<< Back] [Cancel]

FIG. 9C

Ask questions of vendors

You have the opportunity to post specific questions of vendors you're targeting.

ENTER NEW QUESTION

Enter your customized question here:

[_____] ─94

☑ Check here if you require an answer to this question

[Add question] ─95

MY QUESTIONS

| SEQUENCE | QUESTION | ☑ required | FUNCTIONS |
|---|---|---|---|
| 1 | ☑ How many years have you been developing? | | ↓ move down<br>✏ edit<br>✕ delete |
| 2 | ☑ How many engineers do you have available | 96 | ↑ move up<br>✏ edit<br>✕ delete |

97 ─ [Continue >>] [<< Back] [Cancel]

FIG. 9D

| THE BASICS | [ edit ] |
|---|---|
| Company issuing RFP: | Anonymous |
| Title of RFP: | Store front implementation, IIS and ASP |
| Description of RFP: | We are a large bicycle chain and would like to start an online store front to sell our bicycles. We need an e-commerce solution that will run on IIS using ASP. |
| Closest Zip Code to where this RFP must be filled: | 02458 (Newton, Massachusetts) in United States |
| This RFP needs to be filled: | within the next 30 Days |
| Our budget range: | no greater than $10,000 |
| We'll pay vendors using: | Cash |
| Notification: | Email me every response |
| Anonymous description: | |

| TARGETED VENDORS | [ edit ] |
|---|---|
| You've targeted your RFP in the following main category: Web develop. Custom programming/apps, Database Management, Ecommerce, Full Service Agency, Graphic design, Intranet/Extranet, Systems integration, Web site maintenance | |

| QUESTIONS TO VENDORS | [ edit ] |
|---|---|
| Vendors will be asked the following question(s): 1. How many years have you been developing? 2. How many engineers do you have available | |

98 — Submit >>    Save and finish later    Cancel

FIG. 9E

| News Feed Service | 6 Responses |
|---|---|
| THE BASICS | |
| Company posting RFP: | Anonymous |
| Anonymous description: | We are an award-winning business media company with an audience that expects the highest quality content and services. |
| Description of RFP: | We are looking for a cost-effective and flexible way to integrate third-party news feeds into our site. Key requirements are: 1. Timely updated news (business & finance) 2. Ability to filter by sources 3. Ability to filter by topic 4. Ability to edit headline links 5. Fair pricing based on page views 6. Quality sources 7. Easy integration into our CMS OR ASP hosting of stories with private label presentation 8. Ability to serve our ads on article pages |
| This RFP must be filled in the following country: | Anywhere in United States |
| Date posted: | Friday, March 16, 2001 |
| This RFP expires on: | Sunday, April 15, 2001 |
| Our budget: | $10,001 - $25,000 |
| We'll pay vendors using: | Cash |
| TARGETED VENDORS | |
| This RFP is targeted to vendors specialized in the following category:  Web content   Media and news feeds | |
| QUESTIONS TO VENDORS | |
| You've chosen to ask targeted vendors the following questions:  1. Who are your three most respected news providers?  2. Please list the URL of a client site (or demo site) using your services. | |
| 101— Respond to this RFP >> | |

FIG. 10A

News Feed Service

We are looking for a cost-effective and flexible way to integrate third-party news feeds into our site. Key requirements are: 1. Timely updated news (business & finance) 2. Ability to filter by sources 3. Ability to filter by topic 4. Ability to edit headline links 5. Fair pricing based on page views 6. Quality sources 7. Easy integration into our CMS OR ASP hosting of stories with private label presentation 8. Ability to serve our ads on article pages

| ABOUT YOU | | INCLUDE |
|---|---|---|
| Contact name: | Steven M Cohn | 102 ☑ |
| Contact email: | steven@newmediary.com | ☑ |
| Bus. phone: | (617) 9287900 | ☑ |
| Fax number: | (617) 928-5080 | ☑ |

NOTE: Links to company profiles are provided to listing parties. Please keep them current.

| QUESTIONS | | ☑ required |
|---|---|---|
| 1. ☑ Who are your three most respected news providers? | BCD News Co, EFG News Co, and HIJ News Co. | 103 |
| 2. ☑ Please list the URL of a client site (or demo site) using your services. | http:// | |

MORE INFORMATION

If you would like to supply any further information, please enter it here:

104 — Have experience incorporating news feeds with some of the top news aggregation services on the Web.

105 — [Review response >>]

FIG. 10B

| News Feed Service |||
|---|---|---|
| We are looking for a cost-effective and flexible way to integrate third-party news feeds into our site. Key requirements are: 1. Timely updated news (business & finance) 2. Ability to filter by sources 3. Ability to filter by topic 4. Ability to edit headline links 5. Fair pricing based on page views 6. Quality sources 7. Easy integration into our CMS OR ASP hosting of stories with private label presentation 8. Ability to serve our ads on article pages |||
| ABOUT YOU |||
| Contact name: || Steven M Cohn |
| Bus. phone: || (617) 9287900 |
| FAX: || (617) 928-5080 |
| NOTE: Links to company profiles are provided to listing parties. Please keep them current. |||
| QUESTIONS |||
| 1. Who are your three most respected news providers? || BCD News Co, EFG News Co, and HIJ News Co. |
| 2. Please list the URL of a client site (or demo site) using your services. || http:// |
| MORE INFORMATION |||
| Have experience incorporating news feeds with some of the top news aggregation services on the Web. |||
| 106 — Submit response >> | | << Edit response |

FIG. 10C

Searching Newmediary

Use the search form below to find Company Profiles or RFPs.

When Search Results appear, you'll be able to sort them as you wish. For tips on searching, click here.

Search Options

| SELECT A CATEGORY | OPTIONAL SEARCH CRITERIA |
|---|---|
| 171<br>[Web hosting ▼]<br><br>To search within sub-categories, choose a main category above and click the button below:<br><br>(DISPLAY SUB-CATEGORIES) | Company name: [         ]<br>Description: [         ]<br>City name: [         ]<br>State: [         ]<br>Zip Code: [02458]  /172<br>Country: [United States ▼]<br>Search within: [25] [miles ▼] of the above address |

LOOK FOR...

⊙ Company profiles    [Search] /173
○ RFPs

FIG. 17A

```
public class NmGeoCode
{
    public static final double METERS_PER_MILE = 1609.344;

//================================================================================
201
    public static double getDistance (double lat1, double lon1, double lat2, double lon2)
    {
        // approx radius; true radius varies from 6357km (polar) to 6378km (equatorial).
        final double EARTH_RADIUS = 6367000;
                                              202
        // convert from degrees to radians
        double rlat1 = lat1 * Math.PI / 180;
        double rlon1 = lon1 * Math.PI / 180;
        double rlat2 = lat2 * Math.PI / 180;
        double rlon2 = lon2 * Math.PI / 180;

// calclulate distance in meters
        double dlat = rlat2 - rlat1;
        double dlon = rlon2 - rlon1;

double a = Math.pow(Math.sin(dlat / 2),2)
                 + Math.cos(rlat1) * Math.cos(rlat2) * Math.pow(Math.sin(dlon / 2),2);
        double d = 2 * Math.atan2(Math.sqrt(a),Math.sqrt(1-a)) * EARTH_RADIUS;

return(d);
    }

//================================================================================
203
    public static double[] getLatLon(double lat1, double lon1, double crs12, double d12)
    {
        final double EPS = 0.00000000005;
        final double convFactor = 1.852;           //km to nm double dlon, lat2, lon2;
        double rlat1, rlon1, rcrs12, rd12;

rlat1 = lat1 * Math.PI / 180;
        rlon1 = lon1 * Math.PI / 180;
        rcrs12 = crs12 * Math.PI / 180;
        rd12 = d12 / convFactor;                   // now we're in nm
        rd12 = rd12 / (180 * 60 / Math.PI);        // now we're in radians lat2 = Math.asin(Math.sin(rlat1) * Math.cos(rd12)
             + Math.cos(rlat1) * Math.sin(rd12) * Math.cos(rcrs12));

if (Math.abs(Math.cos(lat2)) < EPS)
            lon2 = 0.;                             //endpoint a pole
        else
        {
            dlon = Math.atan2(Math.sin(rcrs12) * Math.sin(rd12)
                 * Math.cos(rlat1), Math.cos(rd12) - Math.sin(rlat1) * Math.sin(lat2));
            lon2 = mod(rlon1 - dlon + Math.PI, 2 * Math.PI) - Math.PI;
        } double[] out = new double[2];
        out[0] = lat2 * (180 / Math.PI);
        out[1] = lon2 * (180 / Math.PI);

return(out);
    }

//================================================================================
    private static double mod(double x, double y)
    {
        return(x - y * Math.floor(x / y));
    }
}
```

FIG. 20 newmediary.com  about  help

Welcome  Newmediary

GENERAL ⊞ ⊟ logout
→ home
  partner network
  create partner
  change partner
  delete partner
  preview partner
  publish
  debug

⊞ BASIC DESIGN
⊞ HTML WRAPPERS
⊞ E-MAIL MESSAGES
⊞ DATA
⊞ REVENUE
⊞ REPORTS

/ 230

Howdy partner!

This site contains tools that allow you to edit the look of your NewMediary Partner site, customize the content of site generated e-mails, and analyze the site traffic and revenue data.

| GENERAL INFORMATION | |
|---|---|
| Name: | Newmediary |
| Tag: | newmediary |
| URL: | network.newmediary.com |
| Parent URL: | www.newmediary.com |
| IP address: | 216.35.192.226 |
| Browser title: | Newmediary.com - Find Business. Find Businesses |
| Support e-mail: | help@newmediary.com |
| Support phone: | 1-800-758-5278 |
| Logo: | \<img src="http://images.newmediary.com/images/partner/ne |
| Options: | ☑ cross-partner branding is enabled<br>☐ This is a demo site<br>☐ This site is "coming soon!"<br>☑ This site is hidden |
| Blurb: | |

231 (pointing to Browser title row)

[ save ] [ revert ]

FIG. 23A

Here are the page layout settings for your NewMediary Partner site. As you change values on the left, new values will be reflected in the sample table shown on the right.

Page Layout

GENERAL

| | |
|---|---|
| Body width: | 100% |
| Toolbar width: | 150 |
| Tips width: | 130 |

COMPONENT PLACEMENT

| | |
|---|---|
| Toolbar: | ☑ enabled |
| Tips: | ☑ enabled |
| About box: | ☑ enabled |

Layout:

Drag and drop the components on the desired locations. Some components are restricted to certain areas.

Toolbar: E
  Tips:    W
  About:   SE

[Sample layout showing: nw, north, ne on top row; tips, content, toolbar in middle; sw, south, about box on bottom — labeled 234]

232, 233, 235 (save, revert buttons)

FIG. 23B

Here are the basic style settings for your NewMediary Partner site. As you change values on the left, new values will be reflected in the sample table shown on the right.

Basic Styles

MAIN PAGE CONTENT

| | |
|---|---|
| Background image: | http://ben:85/redesign/spacers |
| Background color: | #FFFFFF  chooser /236 |
| Foreground color: | #000000  chooser |
| Hilight color: | #990000  chooser |
| Font size: | 2 /237     238 |
| Font face: | Verdana,Arial,Helvetica  chooser |
| Attributes: | ☐ bold ☐ italic /239 |

ERRORS

| | |
|---|---|
| Foreground color: | #FF0000  chooser |
| Attributes: | ☑ bold ☐ italic |

HYPERLINKS

| | |
|---|---|
| Link color: | #003399  chooser |
| Active link color: | #003399  chooser |
| Visited link color: | #003399  chooser |
| Hovered link color: | #66CC33  chooser |

PAGE TITLES

| | |
|---|---|
| Foreground color: | #000000  chooser |
| Font size: | 3 |
| Font face: | Verdana,Arial,Helvetica  chooser |
| Attributes: | ☑ bold ☐ italic |

Save   Revert

Samples

This is a sample of the main body text.

This is a sample of highlighted text.

This is a sample of error text.

normal link
active link
visited link
hovered link

Page Title

Kicker Title

NOTICE TITLE

Button

The footer HTML block describes the bottom of each page on your partner site. Along with the header HTML block, these two code fragments form a visual "wrapper" for your site.

Test each link in your HTML block. Use only full absolute references to your web site; relative references will only direct the user to an error page on the NewMediary servers!

Footer HTML  save  revert  ~404

```
<TABLE border=0 cellPadding=6 cellSpacing=0 width="100%">

<TR>
    <TD align=middle bgColor=#003399><A href="/help/"><IMG alt="Help"
       border=0 height=16 src="<%=imgsrv%>/footer/help.gif"></A>
       <A href="/about/"><IMG alt="About Us"
       border=0 height=16 src="<%=imgsrv%>/footer/aboutus.gif" width=53
```

401  editor rows: 7  cols: 70  wrap:

402

HTML PREVIEW

Note, this preview may not be exactly accurate (e.g. broken images)

help   about us   jobs   usage rules   privacy statement
advertising info   partners

This site is best viewed with Internet Explorer, versions 4.0 or higher. Copyright © 2000 NewMediary.com, Inc. "Newmediary.com" and "Find Business. Find Businesses." are registered trademarks. All rights reserved.

User Delegation

As the administrator of your Partner site, you have the ability - nay, the responsibility - of delegating access to other users to administer all or parts of your Partner site. Use the following form to add, edit, delete users from the delegation list.

USER DELEGATION e-mail: scott@newmediary.com [clear]

| e-mail | Name |
|---|---|
| susan@newmediary.com | Brunelli, Susan J |
| brunelli@newmediary.com | Brunelli, Susan |
| scott@newmediary.com | Cohen, Scott S |
| alayna@newmediary.com | Cohn, Alayna |
| steven@newmediary.com | Cohn, Steven |
| frank@newmediary.com | Hertz, Frank M. |
| john@newmediary.com | Potter, john |

405  406

Permissions

Roles: Business Developer  407

- ☐ General properties
- ☐ Publish
- ☑ Usage reports
- ☑ Revenue reports
- ☑ Build packages
- ☐ Assign Packages
- ☐ Page layout
- ☐ Design styles
- ☐ Preview design  408
- ☐ General content containers
- ☐ About container
- ☐ Story container
- ☐ Home page override
- ☐ Email
- ☐ User delegation
- ☐ Invoice management

[edit] [remove]

FIG. 23E

```
<object runat="Server" scope="Application" id="NmEnums" progid="NewMediary.Enumerations"></object>
<object runat="Server" scope="Application" id="partner" progid="NewMediary.Partner"></object>
                                                                                                    ⟋251
<script language="JavaScript" runat="Server">

//===========================================================================
                              ⟋252
function Application_OnStart ()
{
    var ws = Server.CreateObject("Wscript.Shell");
    var srvnam = ws.regRead("HKLM\\Software\\NewMediary\\srvnam");
    Application("matrix_DSN")     = ws.regRead ("HKLM\\Software\\NewMediary\\DSN");
    Application("matrix_usrnam") = ws.regRead(" HKLM\\Software\\NewMediary\\usrnam");
    Application("matrix_passwd") = ws.regRead(" HKLM\\Software\\NewMediary\\passwd");
    ws = null;
}

//===========================================================================
                           ⟋253
function Session_OnStart ()
{
    var host = Request.ServerVariables("HTTP_HOST");
    var path = new String(Request.ServerVariables("PATH_INFO")).toLowerCase();
    var isDemo = ((host == "demo.newmediary.com") || (path.indexOf("/demo/") >= 0));

if ( (!isDemo) || (!partner.isInitialized()) )
    {
        try
        {
            Application.Lock();
            if (!partner.isInitialized())
                partner.initialize(lookupPartner(host));

Application.UnLock();
        }
        catch (e)
        {
            Application.UnLock();
        }
    }
}

//===========================================================================
                         ⟋254
function lookupPartner (host)
{
    var partnerID = 0;
    try
    {
        var addr = Request.ServerVariables("SERVER_NAME");
        var matrix = Server.CreateObject("ADODB.Connection");
        matrix.open(Application("matrix_DSN"),
              Application("matrix_usrnam"),Application("matrix_passwd"));

var sql = "GetPartnerID @svcaddr='" + host + "',@ip='" + addr + "'";
        var rs = matrix.execute(sql);

if (!rs.EOF)
            partnerID = rs("partnerID").value;

rs.close();
        matrix.close();
        rs = null;
        matrix = null;
    }
    catch (e)
    {
        // do nothing
    } if (partnerID == 0)
        partnerID = NmEnums.NMID;

return(partnerID);
}

</script>
```

FIG. 25

```
<%@ language=JavaScript %>                    261
<!--#include virtual="/common/common.sct"-->

<%                    262
page.openHeader();
page.closeHeader();
page.start();
%>

Content here...    263

<%
page.end();    264
%>
```

FIG. 26

SYSTEM AND METHOD FOR ESTABLISHING BUSINESS TO BUSINESS CONNECTIONS VIA THE INTERNET

CROSS REFERENCE TO RELATED APPLICATIONS

This application claims priority to U.S. Provisional Application Ser. No. 60/219,101 filed Jul. 18, 2000, the teachings of which are hereby incorporated by reference.

FIELD OF THE INVENTION

The present invention relates to the field of business-to-business connections on the Internet and more specifically to an apparatus and method for connecting vendors and buyers by providing a comprehensive and searchable on-line directory of vendors and a means by which buyers can contact those vendors with requests for proposals, quotes, or information through the creation of a Web community composed of Partner or Private Label Web sites.

BACKGROUND OF THE INVENTION

Internet search engines to date have not facilitated business-to-business (B2B) e-commerce in the marketplace for products or services where locality is an important consideration. Buyers and vendors currently have no forum to publish their needs and offerings to a community of qualified service providers because present Web directories lack both the comprehensiveness and functionality that is needed to drive business interactions.

In addition, companies that host and manage traditional online business directories—yellow pages and other interactive directories—have marketed themselves as single-point destination sites. This tact, while effective for some applications, is limited in its reach to both buyers and sellers of products and services. Advertising and marketing expenses consume much of their overall budget. They also need to build their own unique brand affiliation without the aide of an established business relationship with its potential customer base. And finally, a single destination point has limited scalability since it can only reach users within the range of its own advertising and marketing campaigns.

SUMMARY OF THE INVENTION

The present invention seeks to address the above-mentioned problems by providing a comprehensive and searchable network of on-line directories of service providers and a method for a user to use this network to obtain or market products and services on the Internet. The system includes the following software architecture and system design components: Network Data Sharing, Geographic Radius Searching, and Partner Web Site Branding.

These combined components establish a system that:

Leverages the brand affiliation, data resources, and marketing efforts of pre-existing online Web sites to build a large network of buyers and providers of business products and services. This network is configurable in that any partnered Web site can seamlessly share information with any other partnered Web site in the network.

Establishes an incremental revenue stream based on a traditional subscription model, charging providers of products and services a fee to be included in an online directory that buyers can search. Multiple subscription packages can be sold to allow incremental presence and access to qualified leads.

Includes an in-memory caching system that increases performance by decreasing system I/O to a shared database. This cache stores referential copies of object data and system statistics shared across a distributed network of explicitly and implicitly coupled groups of load-balanced Web servers. The system also includes a mechanism that synchronizes information stored in the in-memory caches across these distributed Web servers.

Provides a flexible search engine with which buyers can find providers and providers can find qualified leads in the form of Request for Proposals, Requests for Quotes, or Requests for Information (collectively herein referred to as "an RFP" or "RFPs").

And while the Internet is global, much of the business activity still remains local. For this reason, the search engine provides a means by which entries in the database (providers or RFPs) can be searched based on geographic proximity, for example, a radius search.

Provides a means by which the entire application—provider directory and Request Brokering Engine—can be co-branded or private-labeled. This mechanism transforms the Web application so that it appears to be a cohesive extension of a pre-existing Web site, such as a partner parent site. Branding is managed through a partner accessible Extranet. The branding mechanism describes the visual design elements of the branded site, including fonts, colors, page layout, and custom HTML blocks.

BRIEF DESCRIPTION OF THE DRAWING

The invention is described with reference to the several figures of the drawing, in which:

FIG. 4 illustrates one example of a DSE configuration;

FIG. 7 illustrates one example of the Subscription Sales Process (SSP);

FIGS. 9A-E illustrate the Request For Proposals (RFPs) posting process;

FIGS. 10A-C illustrate the process of responding to the RFPs;

FIGS. 17A-B illustrate the geo-coded searching process;

FIG. 20 illustrates a Java class with two public GRS methods;

FIGS. 23A-E illustrate the Partner Management Tool (PMT);

FIG. 25 is an example global.asa file;

FIG. 26 is the code for a standard template for all Web pages in a PLI;

DETAILED DESCRIPTION OF THE INVENTION

For clarity, this embodiment is divided into three sections:
(1) Network Data Sharing describes the system and method of connecting buyers and providers;
(2) Geographic Radius Searching describes the unique system employed to search the database based on geographical boundaries; and
(3) Partner Web Site Branding describes the system and method of defining visual attributes that can be used to dynamically generate a branded Web site.

The implementation described herein is specific to the platform on which it was originally developed, that being Microsoft Windows NT 4.0 Server running Internet Information Server 4.0 (IIS), Active Server Pages 2.0 (ASP), and Microsoft SQL Server 7.0. References will be made to specific technologies inherent to this environment throughout this embodiment. However, it will be apparent to those skilled in the art that the general programming concepts and architectural design could be equally deployed on many other platforms, Web servers or database servers.

1. Network Data Sharing

Business-to-business e-commerce marketplaces are quickly gaining acceptance in the world at large. While the Web is little more than a loosely connected medium, it becomes extremely beneficial to connect similar marketplaces such that they each share and leverage relevant information. This connected matrix of marketplaces becomes a single distributed system in which businesses interact. The present invention is one such matrix, built from the ground-up to distribute information across many different co-branded and private-labeled Web sites. This system consists of the following subsystems: the Data Sharing Engine (DSE), the Subscription Sales Process (SSP), the Request Brokering Engine (RBE) including the Request Notification Process and the Request Aging Process, the Object Catalog Manager (OCM), and the Catalog Synchronization Process (CSP).

The Data Sharing Engine

Figure 1:
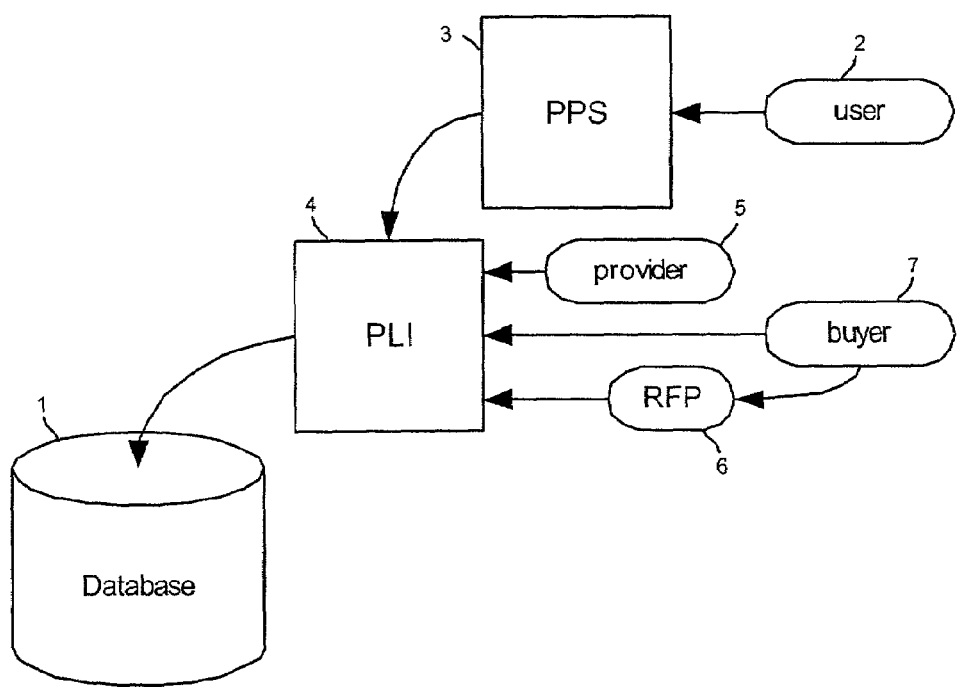
FIG. 1 is a schematic view of a Data Sharing Engine (DSE) according to the invention.

The present invention allows information that is gathered across a plurality of branded Web sites to be shared discriminately between those Web sites. The rules that govern this shared model are based on strategic business relationships and marketplace scope, such as a shared categorization of data across multiple web sites. As depicted in FIG. 1, this system consists of a centralized database 1 that stores the data collected from all participating Web sites. The database schema and processes depicted here are collectively referred to as the Data Sharing Engine (DSE). From a usage perspective, a Web user 2 typically navigates to a Partner Parent Site 3 (PPS). This usage activity could be a result of either viral navigation or providers subscribing to the Partner publications or services on the PPS. The PPS contains links that direct the user into the Private Labeled Interface 4 (PLI). The look-and-feel of the PLI is duplicative of the PPS (described in section 3). At this point, a user may register and subscribe as a provider 5 of business services or products or may register and post an RFP 6, in which case they are now considered a buyer 7 of business services or products.

Figure 2:
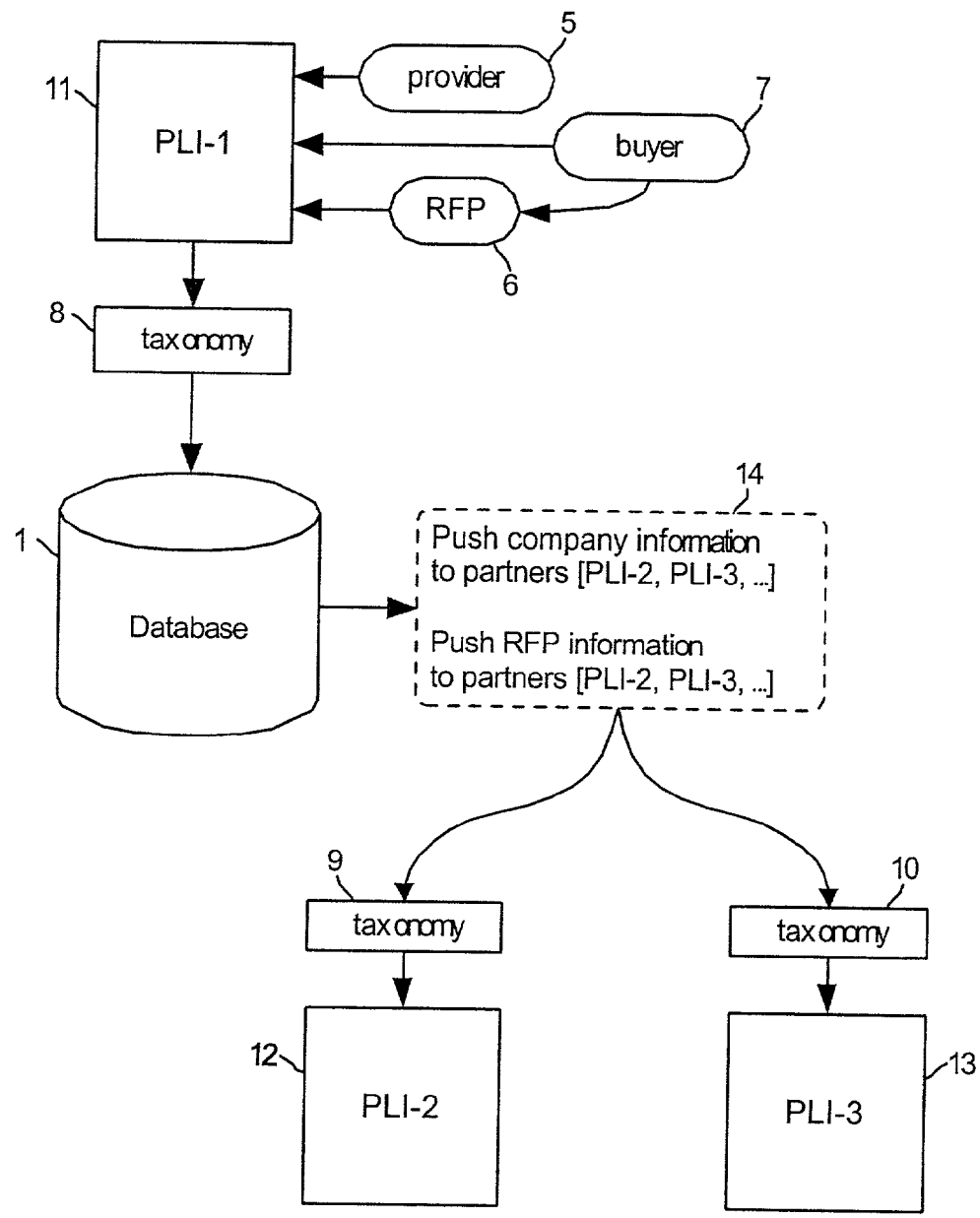
FIG. 2 is a schematic view of a DSE with multiple Private Labeled Interfaces (PLIs)

As subsequent PLIs are created and added to the system, provider, buyer, and RFP information flowing from all PLIs is stored in the single centralized database, i.e., each PLI is considered a "publisher". Additionally, each PLI can also act as a "subscriber", receiving information from one or more remaining PLIs. In this system, information is "pushed" rather than "pulled", as it is more efficient for a publisher to push to a set of predefined subscribers than it is for those subscribes to a) interrogate each publisher, b) determine if that publisher has relevant information, and c) pull that information from the publisher. As depicted in FIG. 2, a single PLI 11, designated PLI-1, attracts both providers 5 and buyers 7 and collects RFPs 6 from the buyers. These three object types are governed by the taxonomy 8 of the PLI-1. This taxonomy is a hierarchical set of categories that are manually selected and assigned to every object when it is created in the system. The objects are stored in the centralized database 1. Once in the system, the DSE applies rules 14 to construct a list of subscribed PLIs to which are pushed the desired objects. The individual taxonomies 9 and 10 of each PLI are similarly used to filter incoming objects; only those objects created with recognizable categories are exposed on the target PLIs 12 and 13, designated PLI-2 and PLI-3.

Figure 3A:
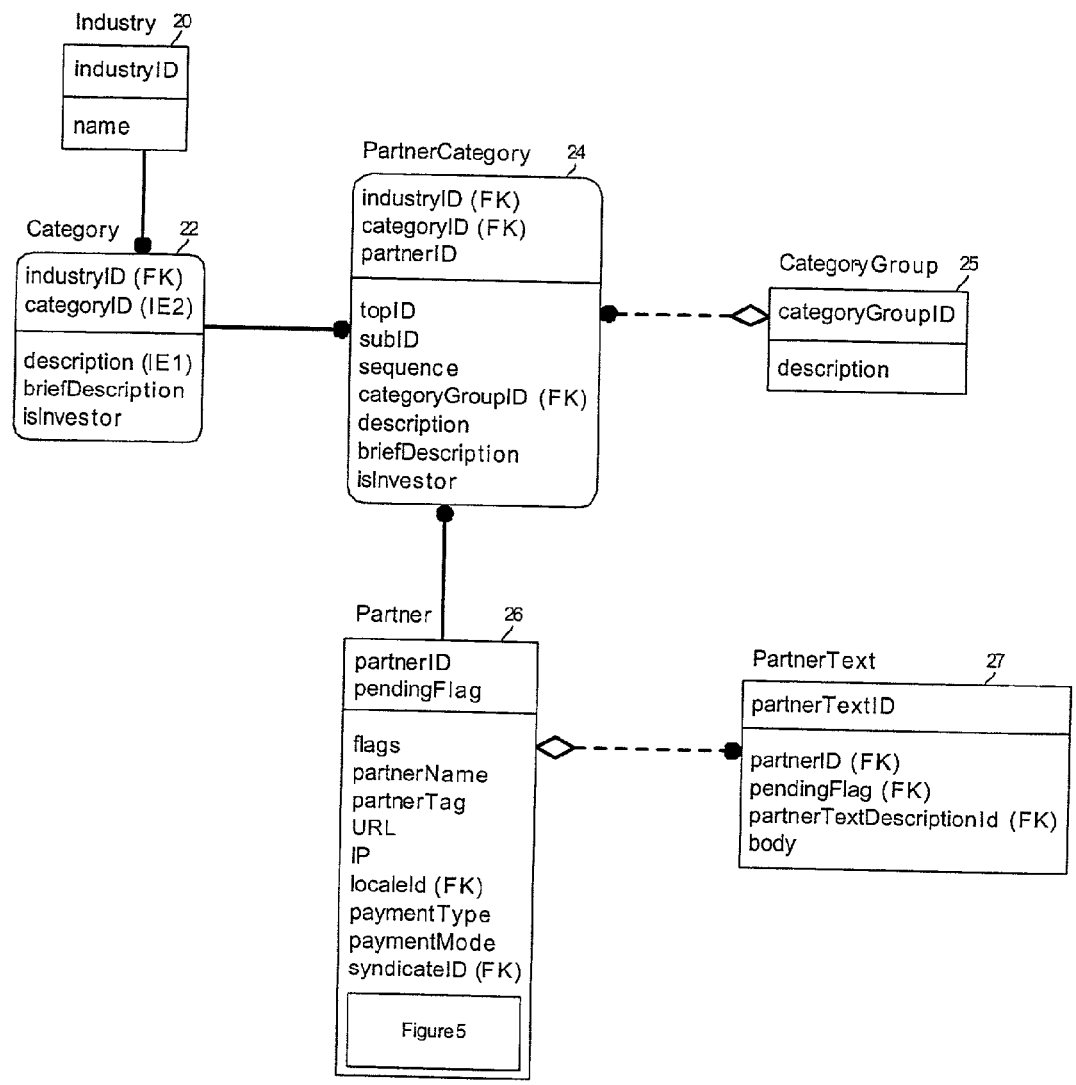
FIGS. 3A-E provide more detailed views of a DSE subsystem.
Figure 3B:
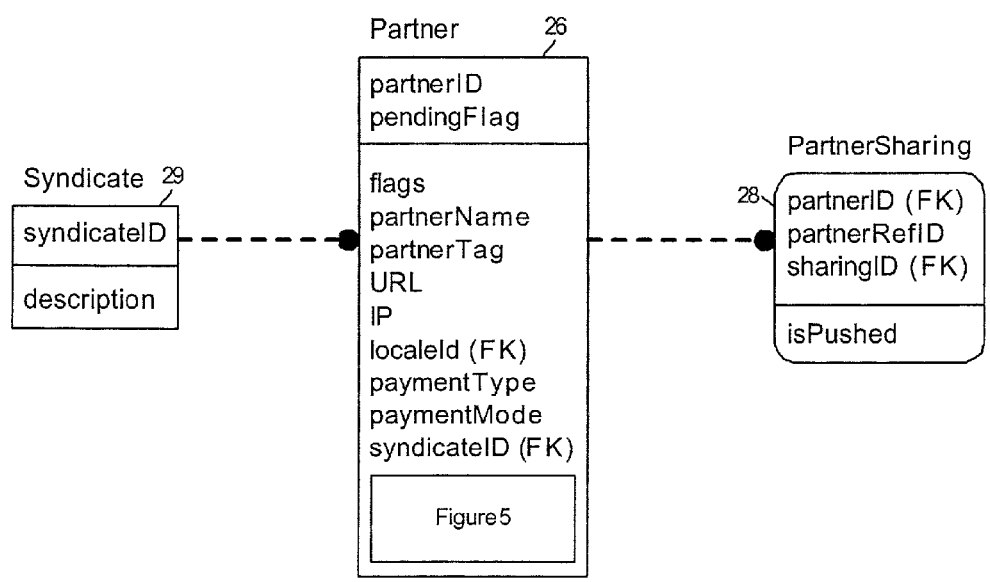

The database schemas shown in FIG. 3A and 3B present a more detailed depiction of this system. FIG. 3A illustrates the basic relationship between PLIs in the system. At the top of the schema hierarchy sits the Industry table 20, consisting of an industryID and a name. This table describes individual industries, sometimes called "vertical marketplaces". Each industry consists of a unique set of base categories described by the Category table 22, which is uniquely identified by the categoryID column. The description and briefDescription columns, while synonymous, are used to specify long and short descriptions of the category respectively; the briefDescription value is used where confined screen space would limit the display of the more lengthy description value. The isInvestor column is used to identify investment categories; we distinguish these categories because the value of investment RFPs are typically an order of magnitude greater than those in other categories, which can lead to misleading data when comparing the total value of all RFPs across categories. Thus, when displaying on various PLIs the total value of live and active RFPs within the "Network" of RFPs the value of said investment RFPs are excluded.

Figure 5:
FIG. 5 illustrates a sample Partner Table in its entirety.

The Partner table 26 describes the basic system properties and visual design elements of a branded Web site. This table is shown in its entirety in FIG. 5. The Partner table is directly correlated with a single PLI. The pendingFlag column contains either 0 (active) or 1 (pending), in effect allowing a maximum of exactly two rows per partnerID. The active row is used in the production environment. The Partner Management Tool, described in section 3, uses the pending row.

Returning to FIG. 3A, in addition to the Partner table, the PartnerText table 27 is used to store text blocks, such as HTML scripts. By separating the textual content into its own table, this affords database administrators with the option of partitioning that data onto separate hard drives—a common practice to increase database performance and fault-tolerance. These text blocks are used to customize the PLI.

Once the visual aspects of the PLI are defined and stored in the Partner table, a taxonomy must be constructed by selectively choosing categories from the Category table 22 and storing reference copies in the PartnerCategory table 24. The topID and subID columns contain numerical values used to build a two-tiered taxonomy of main categories and sub-categories. The sequence column is used to customize the order in which categories are displayed when listed on the PLI. The description and briefDescription columns can be used to override and customize the values in the respective column of the Category table. The isInvestor column is a direct copy of the Category isInvestor column and exists in this de-normalized location to simplify programming tasks. The CategoryGroup table 25 describes a virtual layer by which a set of PartnerCategory rows can be grouped. This control table does not affect process, but is used to present groupings of categories to ease readability and understanding. It is apparent from this schema that categories from multiple industries can be selected to build the taxonomy of a single PLI. This provides the means by which objects can be shared across industries. For example, if "American Honda Motor Company" wanted to participate as a provider in this system, it is conceivable that its listing could be found in the automotive industry, the marine industry, and the home and garden industry, provided that the PLIs in which it listed elected to organize their taxonomies in such a fashion. Additionally, it's apparent that a single category can be used across multiple industries. For example, many industries may share an "Accounting and Tax Services" category.

FIG. 3B illustrates the portion of the schema used to define the data sharing rules mentioned above in the description of FIG. 2. Here, the Partner table 26 has a parent relationship to the PartnerSharing table 28. The PartnerSharing partnerID column identifies the parent-publishing partner. The partnerRefID column identifies the target-subscribing partner. The sharingID column identifies the object type to be shared: 1 is provider, 2 is RFP. Other object types could be defined as well. The isPushed column contains either 0 or 1:1 if objects are to be pushed from the publisher to the subscriber, 0 if objects are not to be pushed. This field provides a means by which sharing can be enabled or disabled based on external rules—such as time of day—without having to invasively create or destroy entire rows in the PartnerSharing table. This table explicitly defines a unidirectional sharing model, that is, a push from one partner to another partner. To define a bi-directional sharing model, additional rows need to be defined in which the partnerID and partnerRefID values are reversed. The Syndicate table 29 is used to build partner relationships in which two or more partners and their PLIs are members of a strategic business alliance, for example, magazine publishers owned by a single parent-publishing corporation. When the same value is stored in the syndicateID column in multiple Partner tables, rules can be programmed that limit ownership of objects to single members within the syndicate. For example, if a provider registers first on PLI-1 and then on PLI-2 and these two PLIs are members of the same syndicate, PLI-1 is considered the owner of any extra information gathered from the provider during the lifespan of the provider's existence in the directories.

FIG. 4 presents an example of a DSE configuration. The Partner table 41 lists four partners. The PartnerSharing table 42 describes the sharing rules among the partners. The partnerID column specifies the publishers; the partnerRefID column specifies the subscriber, where the value 0 acts as a wildcard for all existing partners; and, the sharingID column specifies the object type to push from the publisher to the subscriber, where the value 1 specifies companies and the value 2 specifies RFPs. The Industry table 43 lists the available vertical marketplaces in the system and is used as an anchor point for the categorization tables. The Category table 44 lists the base categories available in the system. Using the base categories, the PartnerCategory table 45 is constructed, describing the taxonomies specific to each partner. Both Partner-A and Partner-B have included all categories in their taxonomies where categories 1 and 4 are main categories, categories 2 and 3 are subcategories of category 1, and categories 5 and 6 are subcategories of category 4. Partner-C and Partner-D only have categories 1, 2 and 3 in their taxonomy.

It is important that the context of a category be preserved within an industry throughout the system, for example, categories 2 and 3 must always remain subordinate to category 1, otherwise the definition and context within the IT Services industry becomes ambiguous.

Given these 5 data sets, sharing matrixes can be constructed for each object type. Both the PartnerSharing table and the PartnerCategory table must be referenced to fully understand the sharing rules. The Company Sharing Matrix 46 shows how objects are pushed from publishers to subscribers. Partner-A pushes all companies to Partner-B since they share the same taxonomy. Partner-A only pushes companies associated with categories 1, 2 and 3 to Partner-C and Partner-D, since these are the only categories common to these partners. Similarly, Partner-C and Partner-D shares companies associated with categories 1, 2 and 3. Note that while Partner-A pushes companies to the other three partners, companies are not pushed from those partners back to Partner-A since there are no rows in the PartnerSharing table that describe those relationships. The RFP Sharing Matrix 47 describes a similar sharing model for the RFP object type. In this model every partner pushes RFPs to all other partners and sharing is limited only by the categories that each partner pair has in common.

The Subscription Sales Process

Now that the foundation of the DSE has been described, a Subscription Sales Process (SSP) that defines object affiliations can be designed. Object affiliations indicate the level of presence each object is given on each PLI directory. Selling membership subscriptions to providers of business products and services generates revenue. This subscription gives a provider a termed presence in one or more PLI directories. The level of presence in a directory is defined by the number and selection of provider attributes that are exposed on a PLI and presented to the buyer. Presence is divided into three categories: company profile, search result positioning and access to RFPs. The company profile database tables are comprised of a number of fields that can be incrementally added to build an increasingly larger profile.

Search result positioning provides a means by which a provider's entry would appear before other entries in a directory search results list.

There are two typical registration usage scenarios. The first scenario occurs when a Web user navigates to the PLI and clicks a Register hyperlink. The user is immediately redirected to an HTML page containing a list of the available subscription packages offered on the PLI. After the user selects a package, they are presented with a list of fields appropriate for the selected package, and they begin building the company profile. Additionally, the user is asked to categorize the company profile by selecting main categories and sub-categories from the PLI's local taxonomy. Once all data has been collected, an affiliation is created between the company and the PLI and the company's entry is included in directory search results and deal flow (e-mail notification of new RFPs) occurring on that PLI.

The second scenario occurs when an inside sales agent who represents one or more PLIs, calls a prospective business provider on the telephone. The sales agent has the option of selling either a subscription on a single PLI or a "multi-pack", that is, a package that consists of subscriptions on multiple PLIs. The advantage of a multi-pack from the provider's perspective is that the provider has the opportunity to gain much wider distribution and reach by leveraging multiple PLIs associated with multiple name brands on the web. To assist in the sales process, the sales agent has the option of selling this multi-pack at a discounted rate.

Figure 3C:
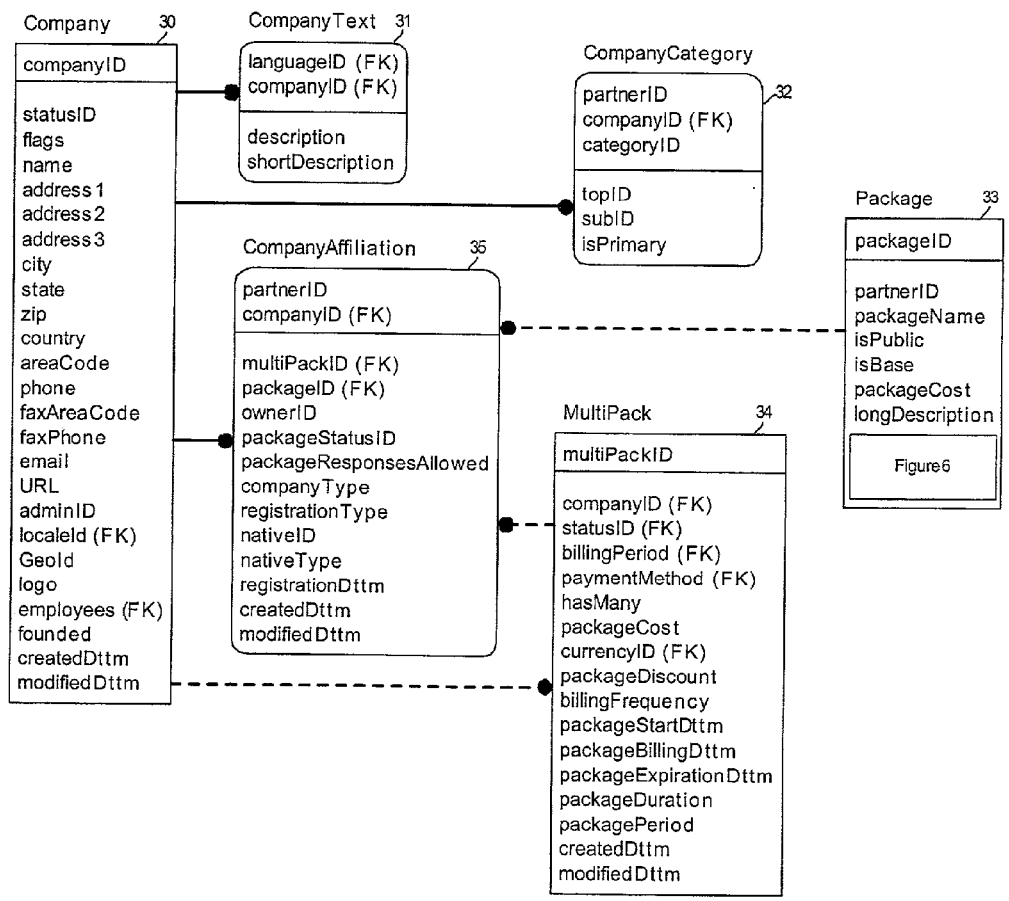

To understand the registration process on one or more PLIs, consider the schema depicted in FIG. 3C. The Company table 30 represents the available attributes that can be associated with a provider of business products and services. The CompanyText table 31 is an additional container of related textual content, such as a company description. Similar to the PartnerText table, this construct allows a database administrator to partition the textual data across separate hard drives for performance and fault-tolerance. The CompanyCategory table 32 is used to store references to the categories selected by the user or sales agent to categorize the company. For each PLI on which a subscription is purchased, the company must be categorized using the list of categories associated with that PLI, that is, categories in the PartnerCategory table. Categorization provides a means by which a company can target their marketing efforts within the directory. In the CompanyCategory table, the partnerID column links to the PartnerCategory table and, hence, the Partner table; the categoryID column links to the PartnerCategory table and, hence, the Category table; the topID and subID columns are duplicative of the same fields in the PartnerCategory table and are here only to provide for efficient programming; and finally, the isPrimary column indicates a single main category by which the company can be identified, for example, in search results.

The Package table 33 describes one or more types of subscriptions that a provider can purchase. A company may have only one subscription on each partner. Each package describes a level of presence afforded the company within the PLI directory (for example, number of company fields shown in the company profile), the level of access provided to the company (for example, the total number of RFPs or highest budget value of an RFP to which the company may respond), the positioning within search results (for example, a provider who purchase a more expensive package appears at the top of a search result list).

The packageID column uniquely identifies each row in the Package table. The packageName column specifies a short, descriptive title of the package. The isPublic column is used in conjunction with internal customer relation management (CRM) tools, where a value of 0 specifies that this is a private package, available on the internal CRM tool and a value of 1 indicates that this is a public package accessible through the PLI, allowing viral subscriptions generated by standard Web traffic. The packageCost column indicates the cost of the subscription package, the currency of which depends upon the locale of the partner.

Figure 6:
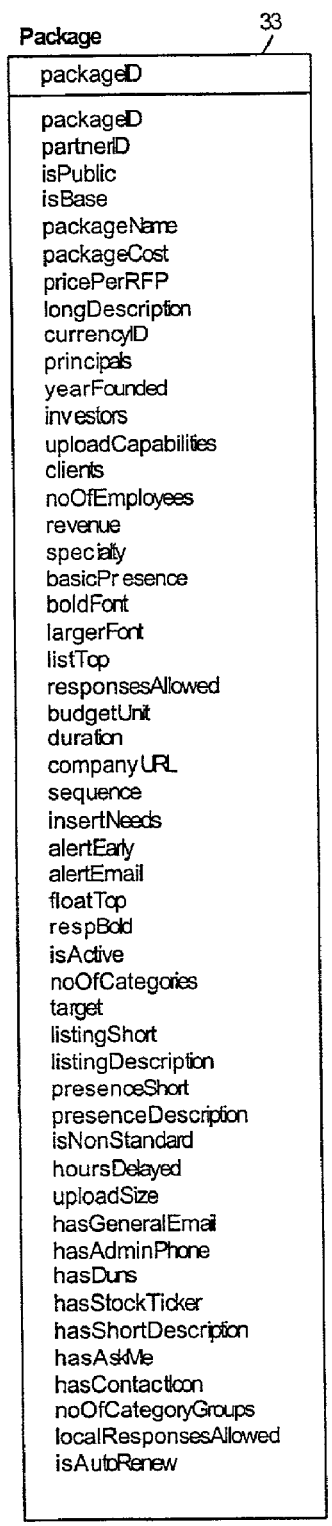
FIG. 6 illustrates a sample detail field of a company profile in its entirety.

The isBase column contains either the value 0 (default) or 1. Exactly one package per partner is the base package and must have an isBase value of 1. The base package is the package granted to a company object when that company is pushed to the partner from a publishing partner. This is typically a free package, but since there could exist more than one free package, for example, public vs. private, the isBase column identifies the package to be granted in this case. In general, the base package is configured and identified by the network manager or database administrator and is not accessible to partner managers who have access to build public packages. The detail fields for a Package table 33, shown in their entirety in FIG. 6, correlate to every possible attribute in a company profile, including, but not limited to, the Company table, the CompanyText table, and other fields in additional tables that may be added to the system.

After the user or a sales agent selects a package and the company information is collected, the system inserts exactly one row in the MultiPack table 34 and one or more rows in the CompanyAffiliation table 35, one for each PLI included in the multi-pack. The MultiPack table accomplishes two goals: Firstly, the multiPackID column is an auto-incrementing numeric field that is shared among all CompanyAffiliation rows associated with the multi-pack deal, and secondly, the table contains fields inherited by and used to override values in the Package table to customize the multi-pack deal, such as alternate discount rates or subscription expiration dates. When a prospective provider registers online, they see a limited set of packages, typically no more than two or three. They have limited, if any at all, ability to change the attributes in these packages. In this case, the values in the respective Package row are copied, without modification, into the MultiPack row. However, a sales agent can use these public packages—or any private package for that matter—as customizable templates to build a dynamic multi-pack sale.

FIG. 7 presents an example of the SSP and assumes the DSE configuration provided by FIG. 4. The first chart shows sample data in the Company table 51 and the Package table 52. Each partner has a free package that is also the base package for that partner and a paid package priced at $99.99.

The second chart 53 describes three scenarios in which Company-A purchases Package-1B on Partner-A in category 1, Company-B purchases Package-1B on Partner-A in category 4, and a sales agent sells a multi-pack to Company-C on Partner-B and Partner-C with Package-2B and Package-3B respectively, both in category 4.

The third chart shows the results of the Subscription Sales Process and Data Sharing Engine. In the first scenario, Company-A purchases Package-1B on Partner-A and selects category 1. Three rows are inserted in the CompanyCategory table for Partner-A: one for the main category 1 and two for the sub-categories. A MultiPack record, with multiPackID 1, is created along with a CompanyAffiliation record on Partner-A. Additionally, as described by the data sharing matrix 46 in FIG. 4, extra rows are inserted into CompanyCategory for Partner-B and a secondary MultiPack record, with multiPackID 2, is created along with an extra row in CompanyAffiliation referencing Package-2A, the base package, for Partner-B. Two MultiPack records are created in this instance to allow the relationship between Company-A and Partner-A to act independently from the relationship between Company-A and Partner-B; Company-A purchased a package on Partner-A, and only as a result of the data sharing matrix, is the Company-A profile available on Partner-B. Company-A most likely would not know at this point in time that its profile is not available on the Partner-B PLI. However, if, at a later time, Company-A, visits Partner-B, the distinct MultiPack record allows Company-A to manage or upgrade the package on Partner-B independently of its package on Partner-A.

A similar process occurs for Company-B. The sales process for Company-C is also similar, except that the multiPackID is used in the association of both Partner-B and Partner-C to indicate that they are bound together and must be changed together, for example, in the case of upgrades or cancellations. An additional MultiPack record and CompanyAffiliation record is added for Partner-D so this relationship can be managed independently.

A typical package structure might be built as follows: A free promotional package is offered which encompasses a basic provider profile, including company name, address, phone number, and the opportunity to be listed in one main category. A Bronze package is offered at $25 per month, or $250 per year including an incentive discount; in addition to the fields available in the free package, this package includes company Web site address, e-mail address and a short company description. A Silver package is offered at $100 per month, or $1000 per year including an incentive discount; in addition to the fields available in the Bronze package, this package includes a graphical logo visible on the profile, a higher presence in directory search results, and the ability to respond to RFPs valued at up to $25,000. A Gold package is offered at $350 per month, or $3500 per year including an incentive discount; in addition to the fields available in the Silver package, this package includes the highest presence in directory search results, the opportunity to select all main categories and unlimited access to respond to RFPs in those categories.

This package structure provides a foundation on which a sales force has the inventory and incentive for initial sales. Online registrations, even free registrations, are encouraged. Companies with free registrations can then be contacted and their listings can be converted to paid packages. Current paid subscribers who have selected either the Bronze or Silver packages present an opportunity for a sales force to up-sell those subscriptions to realize higher incremental revenue streams.

The Request Brokering Engine

The DSE and SSP provide a means with which providers of business products and services can register on one or more PLIs, increasing their exposure on those online properties while converting their listings into revenue. On the other end of the spectrum lie the buyers of business products and services. Buyers can search the directory to find relevant providers of products and services in the desired categories. Using the search capabilities, either through Geographic Radius Searching (GRS), detailed below, or other methods for searching the database of providers, buyers can find and contact service providers that can potentially fill their need. A more highly demanded usage, however, is the need for a buyer to anonymously express their needs to the providers, and subsequently receive responses to their detailed request from qualified service providers. The Request Brokering Engine (RBE) accomplishes this. The RBE is both an extension of the database schema and a systemic online process. Subsystems of the RBE include the Request Notification Process (RNP) and the Request Aging Process (RAP). The RNP generates targeted e-mail to notify appropriate providers when a new request has been posted in their categories. The RAP is a nightly scheduled job that notifies buyers when their request is about to expire and expires out-of-date requests that have not been acted upon by the buyers.

Figure 3D:
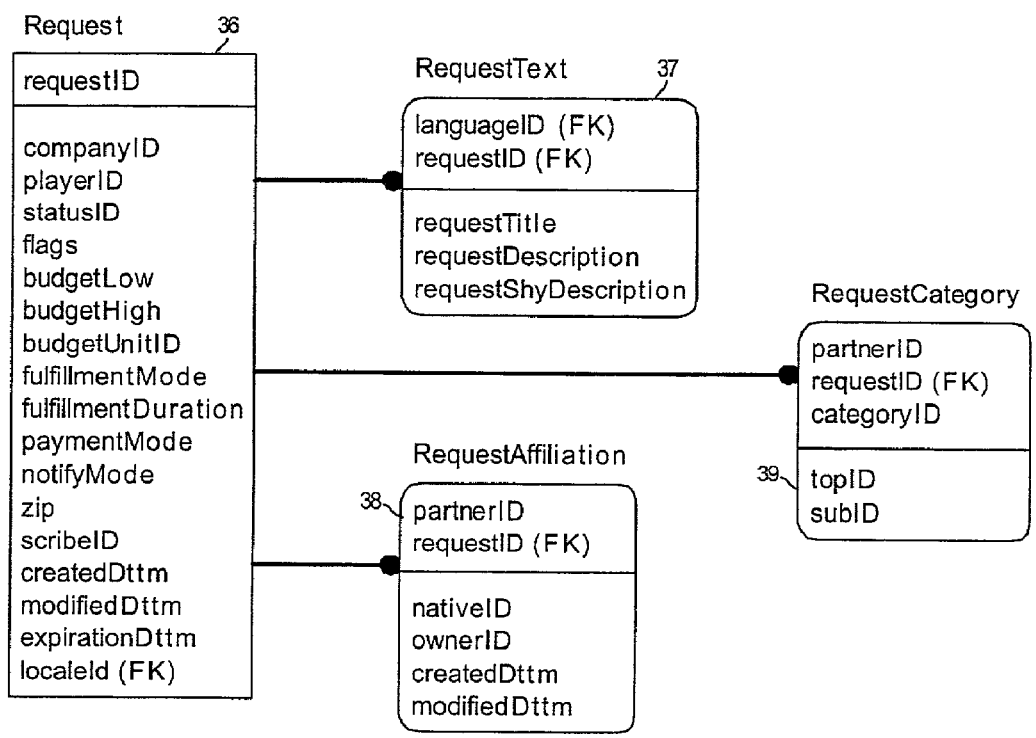

FIG. 3D illustrates the portion of the database schema designed to implement the RBE. The Request table 36 describes the root of the RBE. This table can be expanded to include fields generic to any request type, such as Request for Information, Request for Quote or Request for Proposal. The requestID column uniquely identifies each request in the system. The companyID column relates to the Company table and indicates the buyer's company. The playerID column relates to a Player table that manages personal user information, such as username, passwords, e-mail and name. The statusID column manages the current state of the RFP in the system. These states include, but may not be limited to, the following: holding, pending, active, inactive, rejected expired, deleted, and closed. The RequestText table 37 is used to store textual information. By separating the textual content into its own table, this affords database administrators with the option of partitioning that data onto separate hard drives—a common practice to increase database performance and fault-tolerance. The RequestAffiliation table 38 associates the request with the appropriate PLIs and always contains at least one record representing the PLI on which the request was posted. The insertion of additional records in this table is dictated by the current configuration of the DSE as exemplified in the RFP Sharing Matrix 47 shown in FIG. 4. The RequestCategory table 39 describes the main category and subcategories selected from the list of partner specific categories as contained in the PartnerCategory table. This categorization defines the scope of the request, and hence, the target audience to which the request is sent via the RNP. The initial population of categories from the source PLI are also used by the DSE; as it executes, creating RequestAffiliation records for all shared partners, appropriate RequestCategory records are inserted for each shared partner.

Figure 8A:
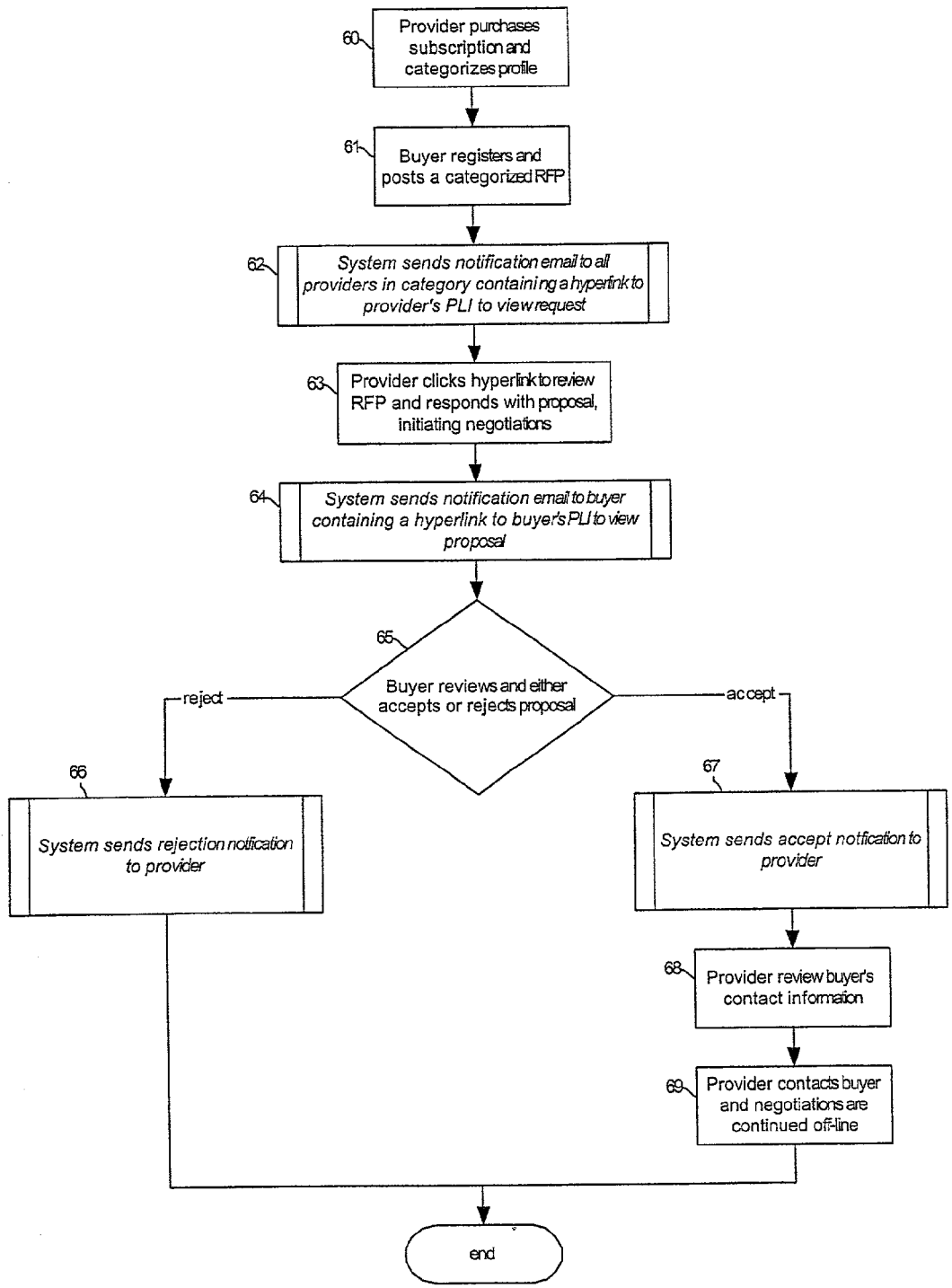
FIGS. 8A-B illustrate processes of the Request Brokering Engine (RBE)

A typical RBE process is outlined by FIG. 8A. In step 60, a provider navigates to a PLI, purchases a package, and categorizes their company profile. The provider is now ready to search for available RFPs in the system in their categories or can wait to be notified via e-mail that a new RFP has been created. While the system does not rely on a categorized provider to pre-exist in the system prior to an RFP being posted, this step merely provides a target audience to capture the system-generated notification e-mail. In step 61, a buyer navigates to any PLI in system that shares RFPs with the PLI on which the provider registered, and posts a new RFP, categorized with one of the base categories selected by the provider.

At this point, the RNP is invoked. This process can run either explicitly as a result of a new request entering the system or can be scheduled on a regular time interval to scan the system for new requests and act upon them. In either case, once a new RFP is recognized, the RNP ascends the database schema from the RequestCategory table to reach the base level categories in the Category table, and then descends down into the CompanyCategory table to identify providers that are associated with the same base categories as the RFP. If one or more providers are identified, an e-mail is generated and transmitted, in step 62, to the e-mail address of the administrator of the provider's profile.

This e-mail contains a hyperlink that, when clicked, invokes a Web browser on the provider's computer and redirects to the Web page that presents the profile of the RFP, as described in step 63. The provider can review the RFP at this time and, optionally, click a button to start a response process. Once a proposal is created, the system sends an e-mail, in step 64, notifying the buyer that a provider has responded to the RFP. This e-mail also contains a hyperlink. This hyperlink specifies the Web address of the proposal. The buyer's Web browser is invoked and immediately redirected to the Web page presenting the provider's proposal. At this point, step 65, the buyer can review the proposal and, optionally, accept or reject it. If the proposal is rejected, the system generates an appropriate e-mail message to notify the provider that their proposal has been declined, as illustrated in step 66. However, if the buyer accepts the proposal, the system generates an e-mail message to notify the provider that their proposal has been accepted, step 67. As standard practice, this e-mail contains a hyperlink that specifies the Web address of the RFP. In step 68 the provider can review the RFP, now with the contact information of the buyer exposed, and can contact the buyer, step 69. At this point, the communication between the buyer and provider is taken off-line.

Figure 8B:
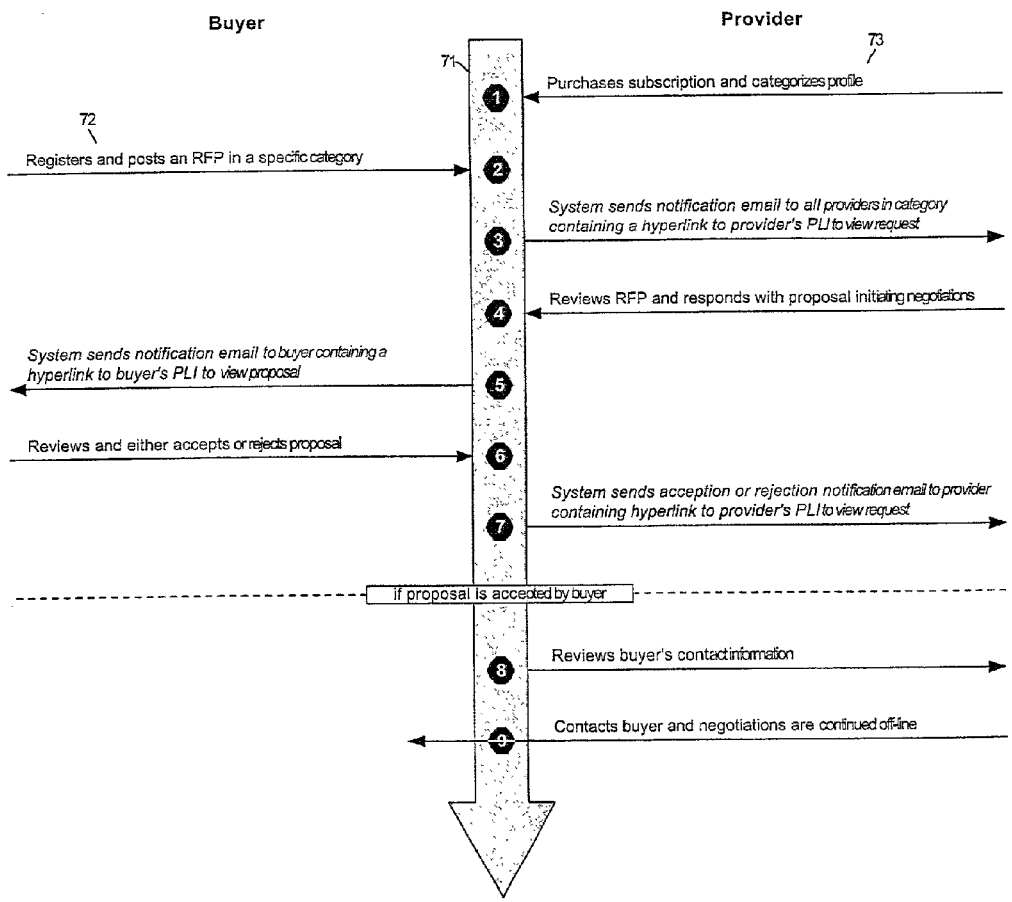

This same process is also depicted in FIG. 8B. This figure is a slightly different view of the RBE process showing a vertical timeline 71, where time increase from the top of the diagram to the bottom of the diagram. This timeline represents the system. On each side of the timeline is a representation of the processes and direction of data flows for the buyers 72 and the providers 73. Each step is numbered within the timeline, 1 through 9.

FIG. 9A though FIG. 9E presents a walk-through of the RFP posting process. In FIG. 9A, the buyer is presented with a list of the main categories available on the current PLI. In this example, the user has selected Web development 81. To proceed to the next step, the user must click the Continue button 82.

FIG. 9B presents the subcategories 83 related to the selected main category. Once all desired subcategories are selected, the user must click the Continue button 84.

FIG. 9C presents the detail section of the RFP. On this page, the user must enter the title of the RFP 85 and a description of the RFP 86. The Location section 87 provides an opportunity to narrow the target audience of providers to a geographic radius from a centralized point. This section could be implemented as a ZIP code as shown here, or could prompt the user to specify a city name or other geographical epicenter. The next section 88 allows the user to specify a date on which the RFP is to expire. This essentially limits the availability of the RFP to providers. The Budget section 89 provides an interface to specify the estimated budget range for this RFP and the next section 90 is used to select methods of payment. By default, all RFPs are posted anonymously; which simply means that providers must use the system, bid on RFPs, and the buyer must select and accept their proposal before the buyer's contact information is exposed to the provider. This increases "stickiness" on the Web site, keeping the users coming back. The next section 91 provides an opportunity for the buyer to enter a brief description in lieu of their actual contact information. The last section 92 allows the buyer to select the frequency in which the RNP is to notify them of new proposals. Finally, the user must click the Continue button 93 to proceed.

FIG. 9D is a simple interface to add, edit, and manage questions appended to the RFP. The top section consists of a text field 94 and an Add question button 95. Once a question is added it appears in the My Questions section where the user can click the edit functions 96 to re-sequence or delete questions in the list. The Continue button 97 must be clicked to continue.

Finally, FIG. 9E depicts the final form of the RFP for review. At this point, the buyer has the option of submitting the RFP 98 or saving it to be submitted at a later time.

The response process is shown in FIG. 10A through FIG. 10C. In FIG. 10C a provider is presented with a complete profile of the anonymous RFP, including all detail fields, category and subcategories, and customized questions. If the provider decides to respond to this RFP with a proposal, the provider must click the Respond to this RFP button 101.

FIG. 10B shows the first step in building a proposal in response to the RFP. The RFP description is included at the top, followed by a section 102 that allows the provider to include their own contact information as part of the proposal. The next section 103 presents the customized questions and provides text boxes in which the provider can enter answers. Finally, the provider may enter additional information 104 and click the Review response button 105 to continue.

FIG. 10C depicts the final form of the proposal for review. At this point, the provider has the option of submitting the RFP 106 or returning to the previous page to edit the proposal.

Object Catalog Manager

There are many incentives that attract providers and buyers of business services and products to register with and use an online business-to-business Web application. One of these is the ability for the user to view the overall scope, size and reach of the Web site. This can be conveyed in a number of ways, the most obvious of which is to present statistical information summarizing the site usage. For example, a provider would be interested in knowing how many active buyers have used the system in the past month, how many buyers posted RFPs in the system, and what the average dollar value of RFPs are in the provider's category. A buyer would be interested in knowing how many active providers are in the system and what the average difference is between RFP budgets and provider proposals.

A typical usage paradigm on many Web sites is to give the user a sense of personalization—the ability of a Web site to alter its appearance or content based on the user's interests. On a B2B Web site, this could be implemented as a standard toolbar that is shown on every page on the site. This toolbar might be comprised of general information about the user, such as name, main category, and current subscription level; and, it may contain visual elements that represent tasks, such as posting an RFP, viewing RFPs in a the user's main category, and upgrading the user's subscription level. But most importantly, the toolbar acts as a communication mechanism and message area to convey statistical information of interest to the user at that time.

Figure 11:
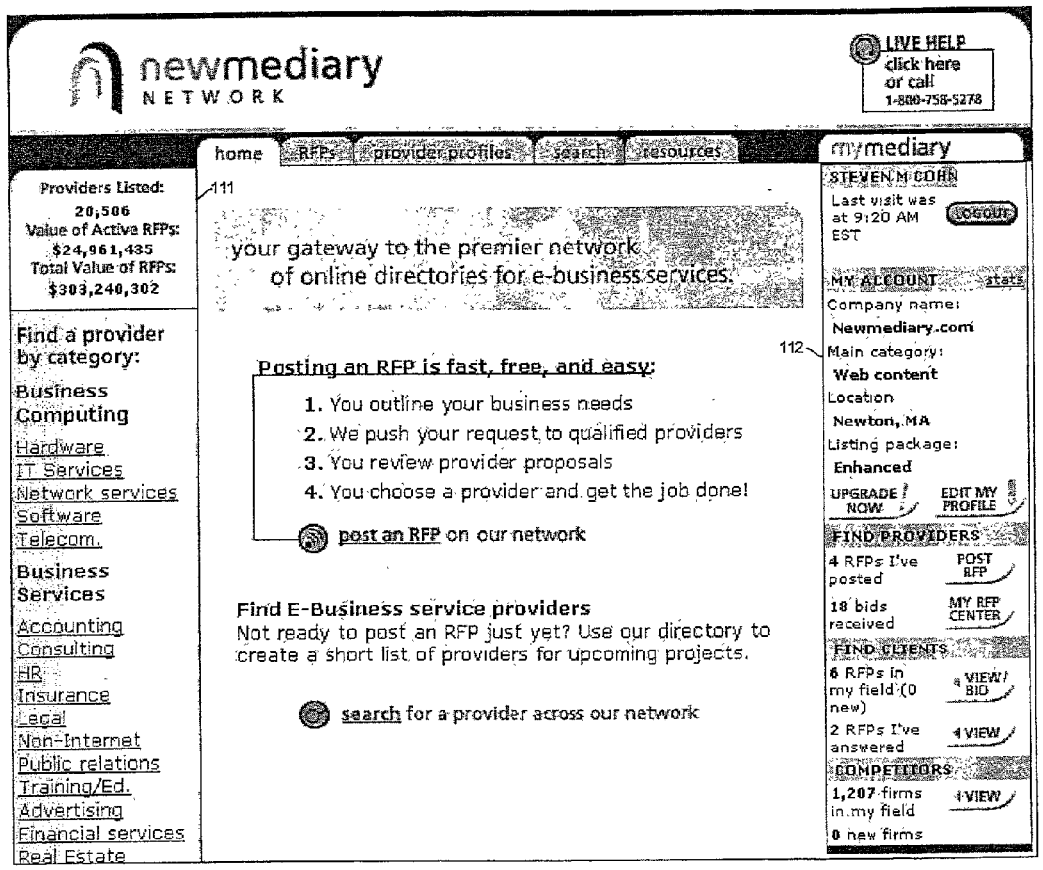
FIG. 11 illustrates the home page of a PLI.

FIG. 11 depicts the home page of a PLI. There are two areas on this page that contain statistical information. Area 111 presents a summary of the total network usage, including the number of providers listed across all PLI directories, the value of all active RFPs in the system, and a running total value of all RFPs ever posted in the system.

Area 112 occupies the majority of the right-hand vertical treatment on the page. This is the personalized toolbar. The toolbar can be used to display provider and buyer statistics depending on the previous activities performed by the current user. In this example, both provider-focused and buyer-focused statistics are displayed. At the top of the toolbar is shown the user's name and date or time of the last visit. This is followed by general information about the company, including the main category, location and subscription level. The last three sections include both statistical, targeted information and action items. The Find Providers section allows the provider to act as a buyer. The number of RFPs posted by this user and the number of bids, or proposals, received from providers as a result of those RFPs are shown along with buttons that allow the user to post a new RFP or view their RFP Center. The Find Clients section is directed to the provider and shows the number of RFPs in the provider's category and the number of RFPs responded to by this provider. Lastly, the Competitors section allows this provider to view all other providers—potential competitors—in their category.

Figure 12:
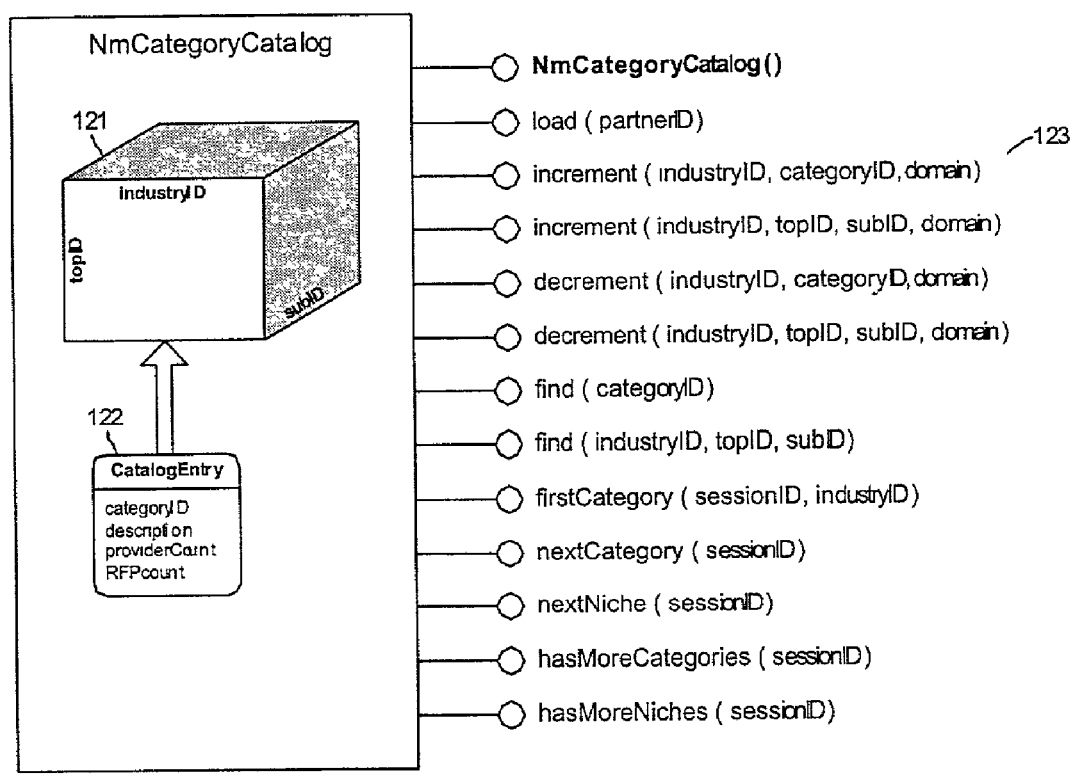
FIG. 12 illustrates the NmCategoryCatalog class.

The present invention employs a memory-resident cache to maintain these types of statistics. This cache is implemented as a Windows COM class instantiated as an IIS Active Server Page Application object. This COM class and its public interfaces are known as the Object Catalog Manager (OCM). One of the public interfaces to the OCM is the NmCategoryCatalog class. This object, as illustrated in FIG. 12, manages a three-dimensional data structure 121 in which each dimension is implemented as a linked-list. The first dimension is the industryID; the second dimension is the topID specific to the PLI taxonomy; the third dimension is the subID specific to the PLI taxonomy. The data node, or leaf, at each intersection is a complex record 122 containing the base categoryID, text description of the category, and the provider and RFP counts associated with the category. When a new provider registers on the PLI, or a new RFP is posted by a buyer on the PLI a reference is made to the Application scope COM object and the appropriate increment method 123 is invoked specifying either 1, provider, or 2, RFP, as the domain parameter. The other interfaces to this component allow programmers to reload the taxonomy (which refreshes the statistics), decrement individual statistics, search the taxonomy, and iterate through the entire taxonomy.

Catalog Synchronization Process

Figure 13:
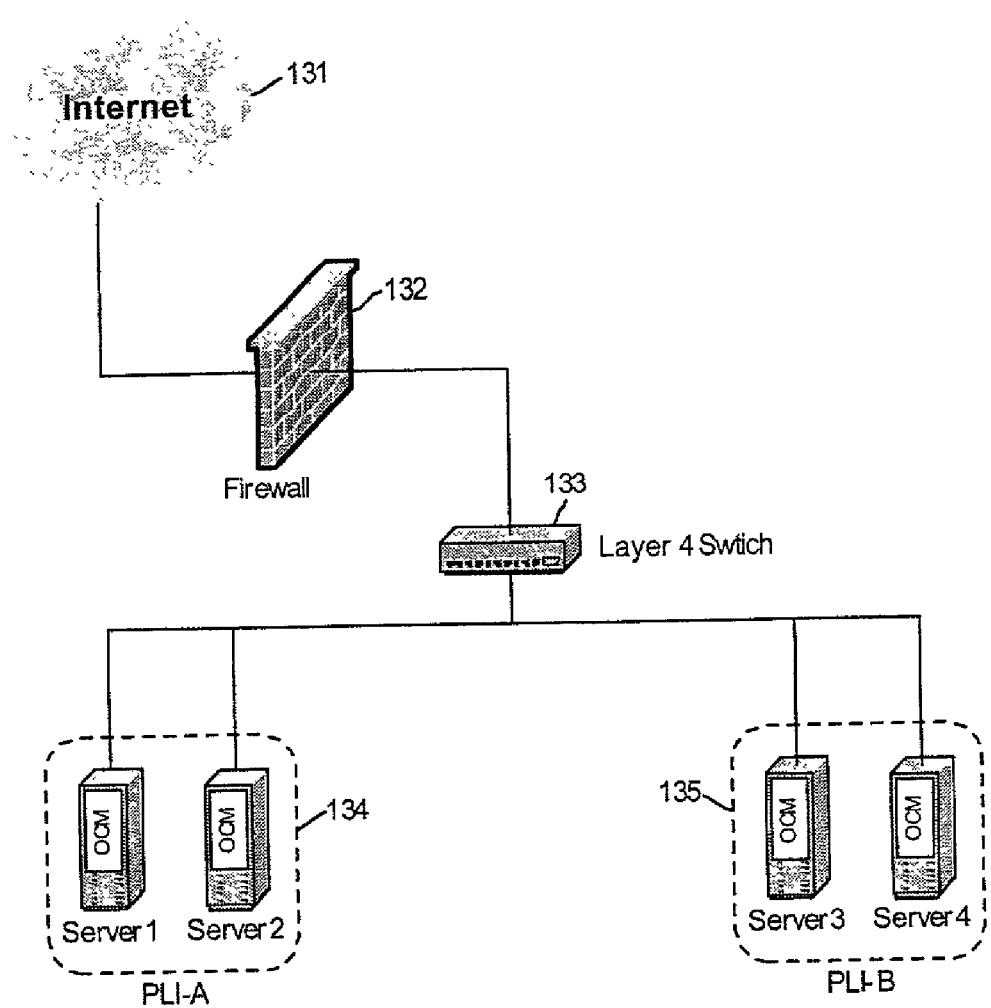
FIG. 13 illustrates the process of switching Internet traffic in order to load-balance.

As Web sites become more ubiquitous and Internet traffic continues to rise, the design and implementation of Web site infrastructures must evolved to accommodate performance and scalability requirements. It has become common to deploy a single Web site across multiple physical Web server computers. As shown in FIG. 13, network traffic from the Internet 131 passes through a firewall 132 and is captured by an ISO Layer 4 network switch 133. This switch is capable of load-balancing traffic from the Internet between two or more Web servers. In this example, PLI-A is hosted on two load-balanced Web servers 134, Server 1 and Server 2; PLI-B is hosted on two other load-balanced Web servers 135, Server 3 and Server 4. While this increases performance by distributing computing power, this also creates the need for a mechanism to synchronize the individual memory resident caches managed by the OCM on each server.

Figure 3E:
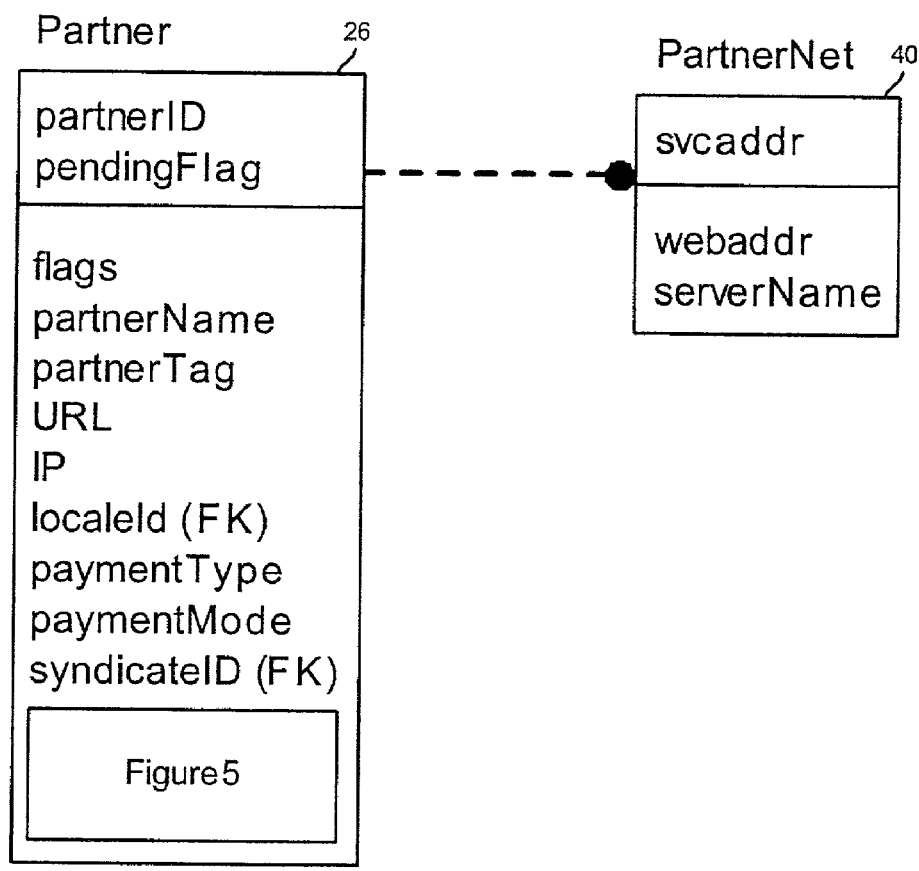

The Catalog Synchronization Process (CSP) is a distributed process that keeps statistical information updated across all load-balanced PLI Web servers. The CSP allows one Web server to send update commands to other Web servers. The target Web server could either be a subsequent server within the same load-balanced group or it could be a member of the DSE configuration. As a prerequisite, the CSP needs a topology of the internal network. As shown in FIG. 3E, this is described in the database schema by associating the PartnerNet table 40 with the Partner table 26. This table consists of a unique svcaddr identity column used to specify the private (internal LAN) IP address of a Web server. The webaddr column specifies the public (external WAN) IP address of the PLI. The serverName column is a text description used to specify the name of the Web server computer.

Figure 14A:
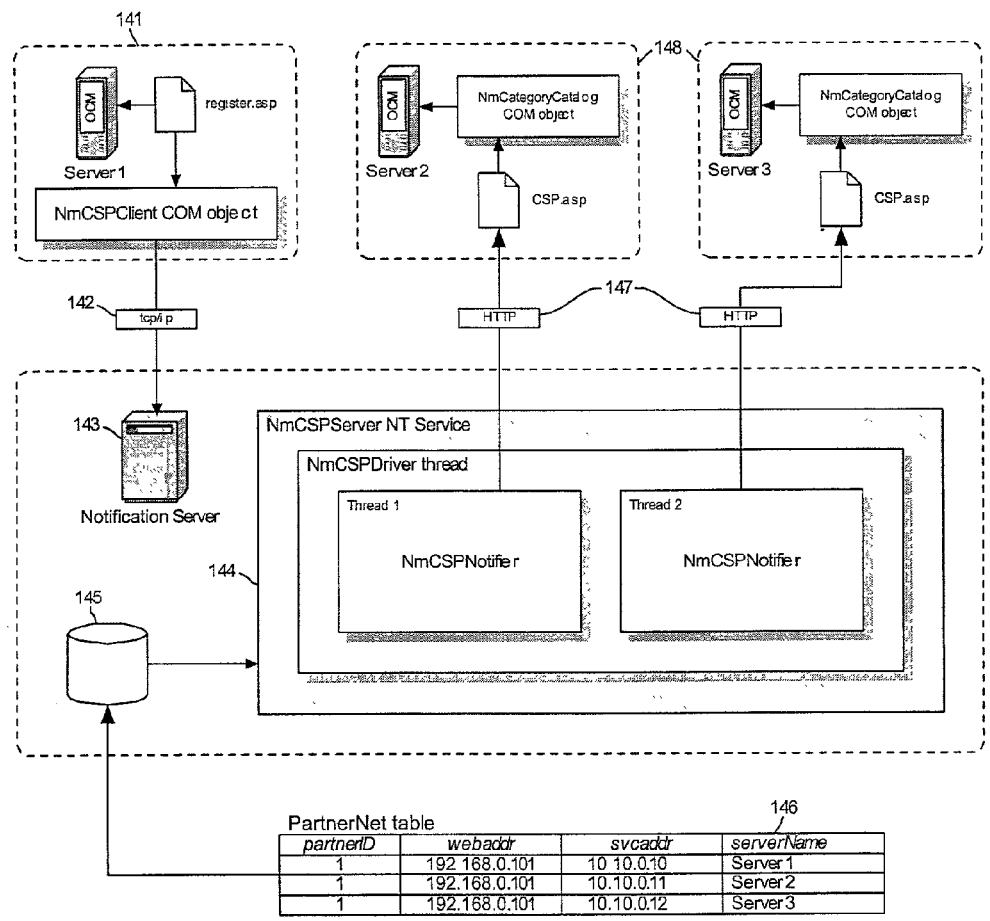
FIGS. 14A-B illustrate the Catalog Synchronization Process (CSP) architecture.

The CSP architecture is illustrated in FIG. 14A. This example shows the process of a user registering on the Web site by accessing the register.asp.page 141. Assuming Server 1 is part of a load-balanced group including Server 2 and Server 3, when the user registers, the register.asp can update the OCM locally by interfacing with increment and decrement methods of the NmCategoryCatalog object.

The register.asp page also contains code to instantiate the NmCSPClient COM object.

Figure 14B:
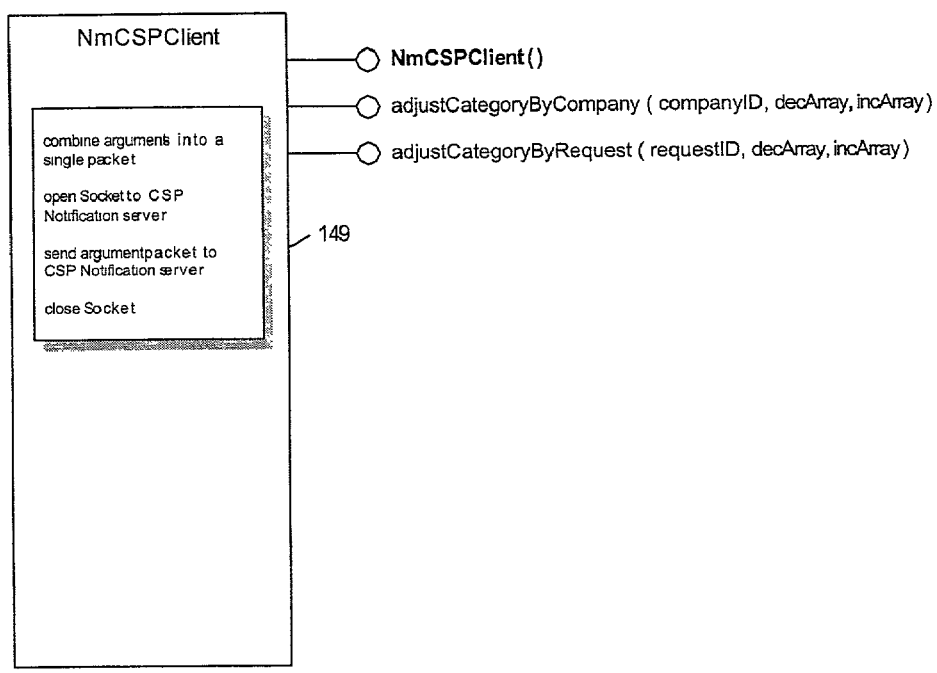

This NmCSPClient COM object 149 is shown in FIG. 14B. Besides its constructor, its interface consists of two public methods. The adjustCategoryByCompany method accepts a companyID argument, a decArray argument and an incArray argument. The decArray argument is either an array construct or a delimited string specifying a list of base categoryID values. For each categoryID in this list, the company total is decrement. The incArray argument is similar, except that for each categoryID in its list, the associated company total is incremented. Both arguments are necessary to handle the scenario in which a company edits its category associations; the old categories must be decremented and the new categories must be incremented.

The adjustCategoryByRequest method is similar, except that it accepts a requestID argument specifying the RFP to use as a guide.

The internals of NmCSPClient do not actually affect statistics directly. Referring again to FIG. 14A, the purpose of this object is to send a message over TCP/IP 142, using a Socket interface, to a CSP Notification server 143 located on the computer on the LAN. On the CSP Notification server is a system process, such as an NT Service on Windows NT, called the NmCSPServer process 144. NmCSPServer contains one main thread—NmCSPDriver—that listens for incoming requests from remote NmCSPClient processes. When a request is received, the NmCSPDriver thread fetches the network topology related to the client PLI Web server from the PartnerNet table 146 located in the centralized system database 145. In this example, PLI 1 is load-balanced across three servers: 10.10.0.10, 10.10.0.11, and 10.10.0.12. NmCSPDriver recognizes the IP address of the NmCSPClient and ignores it assuming its OCM was updated locally by register.asp. It continues to build a list of all subsequent IP addresses—in this case, those of Server 2 and Server 3. The NmCSPDriver thread then instantiates a new thread of the NmCSPNotifier class for each of these servers, Thread 1 and Thread 2. This last thread layer is required to ensure a maximum success rate. Each thread targets a single remote Web server. If any server is unavailable then the thread will timeout, but will not affect the performance of the other threads in the system. These threads build HTTP requests 147 to the CSP.asp page on the remote servers. The CSP.asp page is a system page that is never accessed by normal Web users; only the NmCSPServer process on the CSP notification server invokes it. The CSP.asp page references the NmCategoryCatalog object 148, invoking a form of either the increment or decrement methods, as needed, which updates the statistics in the local OCM on that server.

2. Geographic Radius Searching

Geographic Radius Searching (GRS) is the ability to search for data based on geographic locations and distances. At first impression, this appears to be a simple geometric equation to calculate the distance between two longitude/latitude coordinates on a sphere. However, given the shear volume of data, this presents a unique technological challenge to achieve sufficient performance and minimize search time durations. Given a data set consisting of the longitude/latitude coordinates of the epicenter of either a postal code or a city or town name, there are currently 42,707 unique geographic points in the United States. While this may not overburden most modern database systems, adding Canadian data, to cover North America, increases that number to 795,262 unique points. The United Kingdom alone has 1,726,199 unique points, which further increasing the number to 2,521,973. The total number of unique points increases very rapidly as countries are added to the system.

The present invention demonstrates a unique database solution to provide efficient search time durations. This solution is implemented using Microsoft SQL Server 7.0. Those familiar with the art will realize the portability of the concepts to other database platforms.

Figure 15:
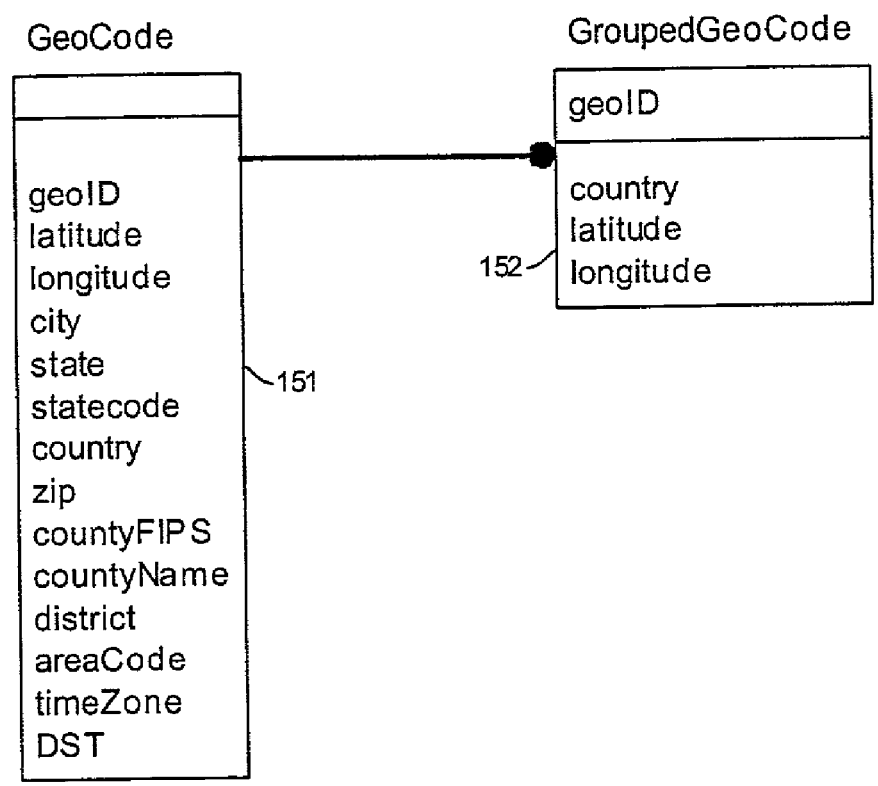
FIG. 15 illustrates two database tables, GeoCode and GroupedGeoCode.

FIG. 15 depicts two database tables, GeoCode 151 and GroupedGeoCode 152. The GeoCode table contains a very fine level of detail, relating longitude and latitude coordinates to geographic locations. For example, in the United States, data is readily available that maps coordinates to the epicenter of regions described by standard U.S. ZIP codes. All other fields in these records are considered detail fields. The GroupedGeoCode table is an aggregated form of the data in the GeoCode table where each record contains a unique longitude/latitude coordinate.

Figure 16:
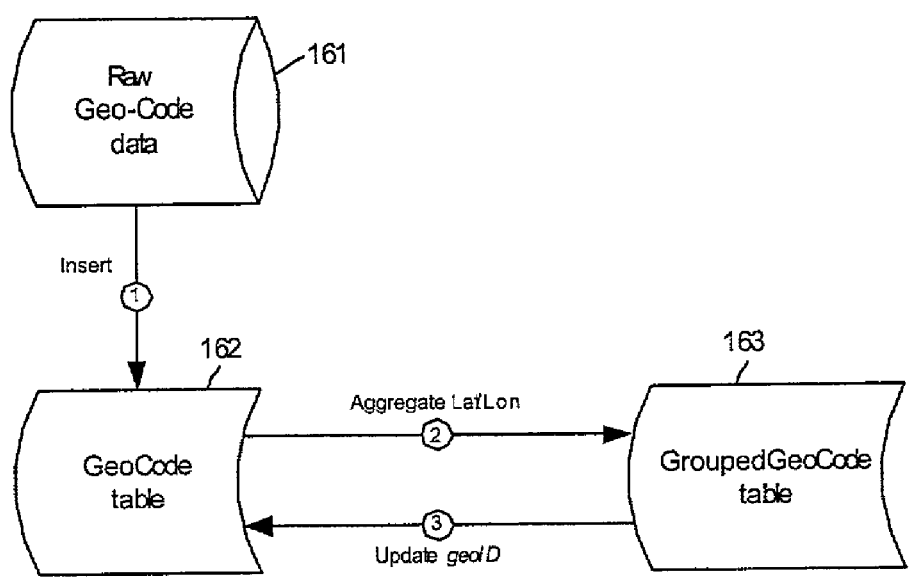
FIG. 16 illustrates the population process of the two tables in FIG. 15.

FIG. 16 depicts the population process of these two tables. Geo-coded data 162 is received and loaded directly into the GeoCode table 162. Data from the GeoCode table is aggregated on distinct longitude/latitude and country code values and inserted into the GroupedGeoCode table 163. It is important at this step to round off the longitude and latitude values to a manageable number of decimal places—typically 2—which drastically reduced the number of data points—about 90%—while still maintaining a certain level of accuracy. This insertion process auto-generates the unique geoID identifier column. A third and final procedure is executed that copies the generated geoID value back to the relevant records in the GeoCode table. The GroupedGeoCode table now represents the smallest dataset containing information accurate enough to locate geographic points.

Figure 17B:

Once the geo-coded data has been imported and normalized in the database, users can conduct geographic radius searches. For example, a company in Newton, Mass. may be interested in all Web Hosting providers within a 25-mile radius of their corporate office. The screen shots shown in FIG. 17A and FIG. 17B depict this scenario. In FIG. 17A, the user selects a target category 171, enters the ZIP code and country of their location and a distance to search from the center of that geographic region 172 and clicks the Search button 173. The system executes a search against the database and presents the results as shown in FIG. 17B. In this figure, the providers are listed in the main body of the page, ordered by distance 174. Note that the distance from the first provider is greater than that of the second provider. This is because the first provider purchased a subscription package that granted that provider a higher level of presence in the search results. All subsequent listings are ordered in increasing distance.

This page also offers an opportunity to advertise premium subscribers. Providers who have purchased high-end subscriptions are allowed to upload a 125×125-pixel graphic as shown at the top of the search page 175. Providers who have purchased a second level package are allowed to upload a 125×60-pixel graphic shown to the right of the search results 176. These graphics are displayed using a typical ad-serving rotation algorithm. If a buyer clicks on one of these graphics, their Web browser is redirected to the profile page of the provider.

Figure 18:
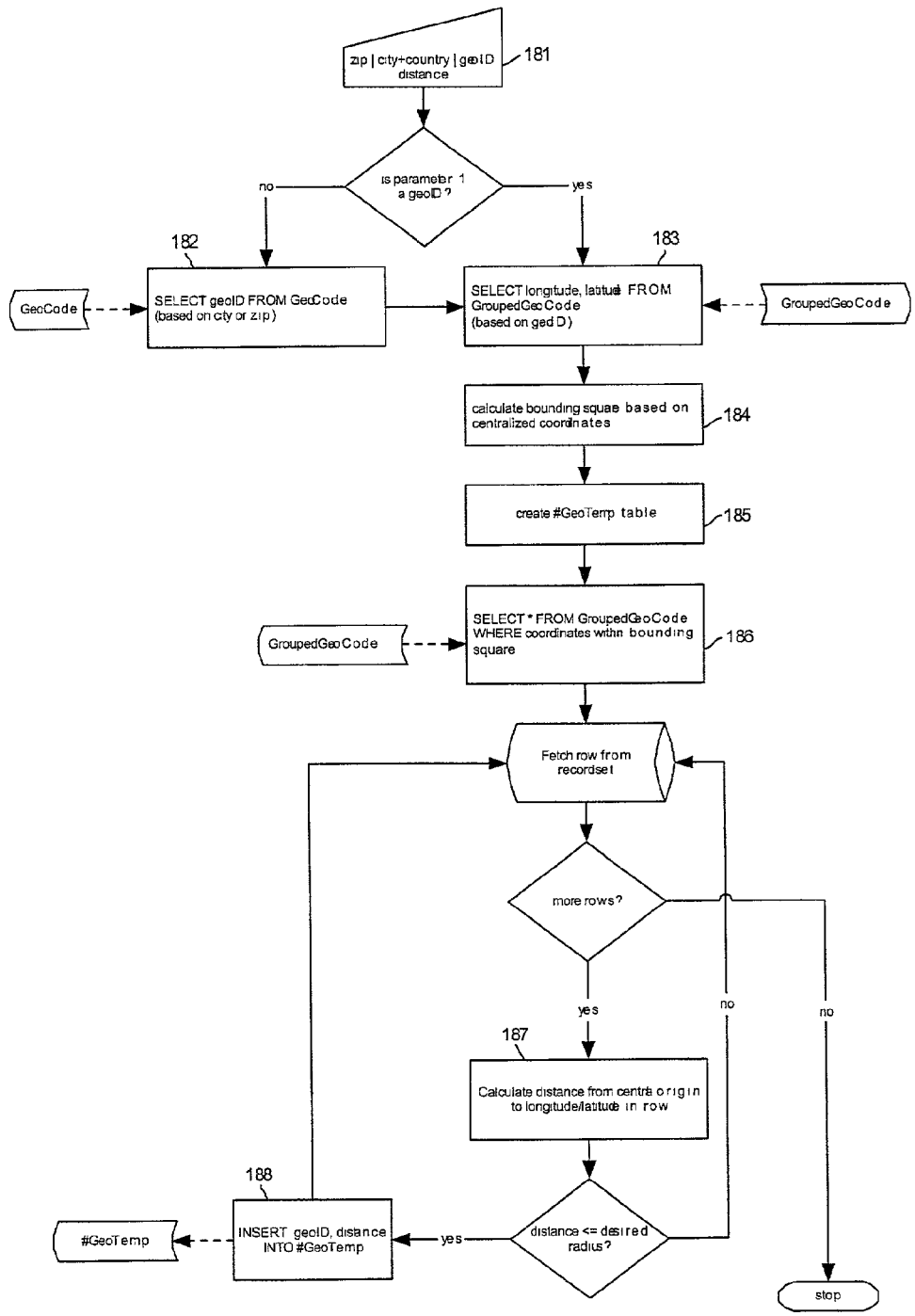
FIG. 18 illustrates the core process of the Geographic Radius Searching (GRS) engine.

FIG. 18 shows the core process of the GRS engine. This process accepts a postal code, a city name and country code, or a geoID value as its first parameter 181. This indicates the region containing the epicenter from which a radius search is to be performed. It also accepts a distance as its second parameter, which is used to compare the distance of entries in the database to the given epicenter. If the first parameter is not a geoID value, the system searches the GeoCode table 182 for the geoID associated with the given postal code or city name and country code. Once a geoID value is discovered, the system searches the GroupedGeoCode table 183 for the longitude and latitude of the given geoID. This is the epicenter of the search. The system then calculates a bounding square 184 centered at the epicenter, by adding and subtracting the distance from the longitude to calculate the western-most and eastern-most longitude boundaries respectively, as well as adding and subtracting the distance from the latitude to calculate the northern-most and southern-most latitude boundaries respectively.

At this point, a temporary table 185 is created in the database called #GeoTemp. This table is used to hold all geofd values within distance miles of the epicenter. The system then selects all records from the GroupedGeoCode table 186 where the longitude is greater than or equal to the western-most boundary and less than or equal to the eastern-most boundary and where the latitude is greater than or equal to the northern-most boundary and less than or equal to the southern-most boundary, meaning all records where the coordinates lie within the bounding square.

At this point, the system has a superset of all records actually needed, including the coordinates approaching the corners of the bounding square, which fall beyond the distance from the epicenter. The system iterates through each record in this data set and calculates the distance from the epicenter to the coordinates specified in the record 187. If the distance is less than or equal to the value of the distance parameter then a new record is appended to the #GeoTemp table 188 containing the geoID of the record and the distance from the epicenter.

Figure 19:
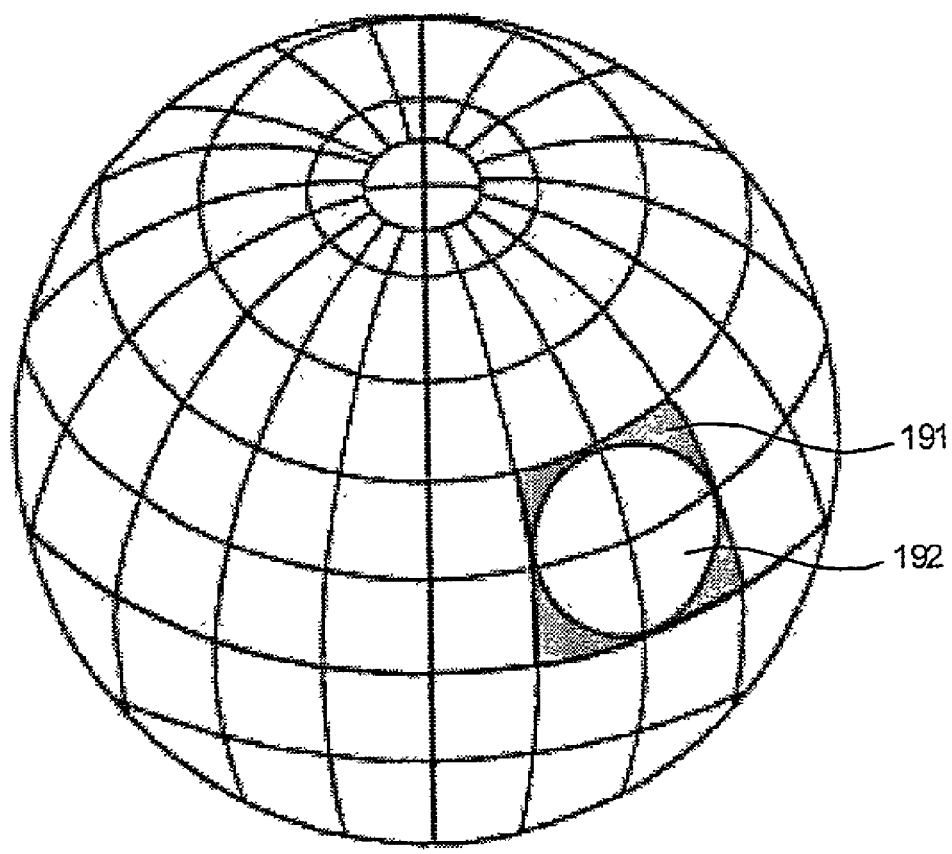
FIG. 19 is a simple illustration of the geometry of the GRS method.

FIG. 19 is a simple depiction of the geometry of this method. All records within the bounding square 191 are examined and compared to the epicenter to determine the region bound by the circle 192 of the specified radius.

The #GeoTemp temporary table can now be referenced by a standard SQL statement appended with the clause "WHERE Company.geoID IN (SELECT geoID FROM #GeoTemp)". (As shown in FIG. 3C, the Company table 30 maintains a geoID value.) Once the search is completed, the #GeoTemp table can be deleted.

There are various formulas that can be employed to calculate the distance between two coordinates. As an example, FIG. 20 shows a Java class with two public methods. The getDistance() method 201 calculates the distance between two points. This method assumes a maximum of a 2% error considering the Earth is not a perfect sphere. The great circle radius is assumed to be the average 202 of the polar radius and the equatorial radius. The getLatLon()

method 203 calculates a point d12 kilometers from lat1/lon1latitude/longitude at crs12 degrees.

3. Partner Web Site Branding

When an application service provider (ASP) offers a Web-based application to be licensed to business partners who maintain their own Web sites, either the ASP's application is treated as a separate Web site with its own user interface, visual branding, and design elements or the ASP changes the presentation layer of the application to mimic that of the partner Web site.

This has traditionally been an extremely resource intensive task, accomplished by manually reworking the source code of the original application Web site to incorporate the branding and design elements of the partner Web site. The obvious drawback to this approach is that the ASP now must maintain multiple source threads of the product, one for each branded version, for the entire life cycle of the product.

The present invention includes a unique Site Branding System (SBS) for automating the design and publication of a plurality of branded Web sites, all driven from a single application code base. This system also provides a mean by which the partners can manage their branded sites through an Extranet. This database-driven system provides maximum flexibility while affording the most rapid deployment model available. The SBS includes the Partner Management Tool (PMT), the Brand Distribution Service (BDS) and the Partner Branding Framework (PBF).

Partner Management Tool

Figure 21:
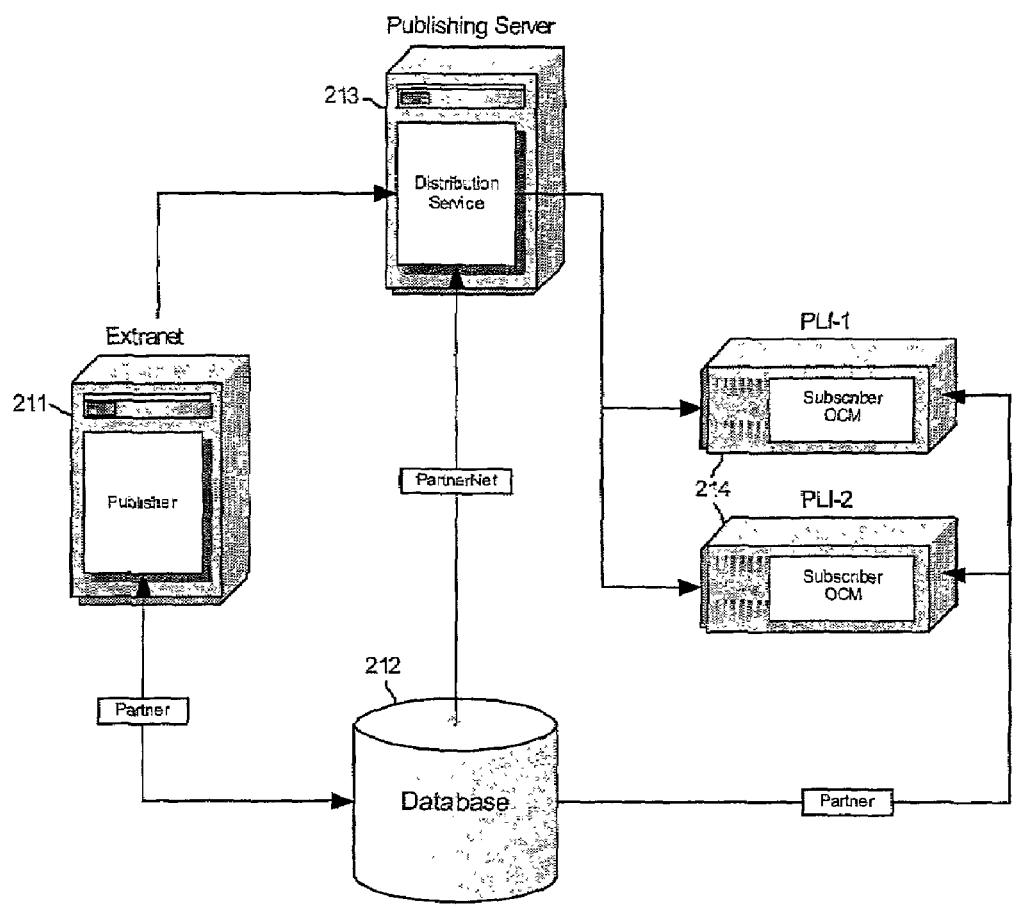
FIG. 21 illustrates the general system architecture of the Site Branding System (SBS)

Partner Private Label Interface Web sites (PLIs) are managed using a system of computers, including Web servers and database servers, and specialized software. FIG. 21 illustrates the general system architecture of the SBS. The Partner Management Tool (PMT) is hosted on an extranet Web server 211. The PMT allows either a partner manager or an employee of the partner company to edit the partner's PLI configuration. The configuration is stored in a database 212 that contains the metadata and data that describes the unique branding of the PLI. The PLI Web sites 214 include software that reads the branding data from the database and uses it to generate the appropriate HTML.

Figure 22:
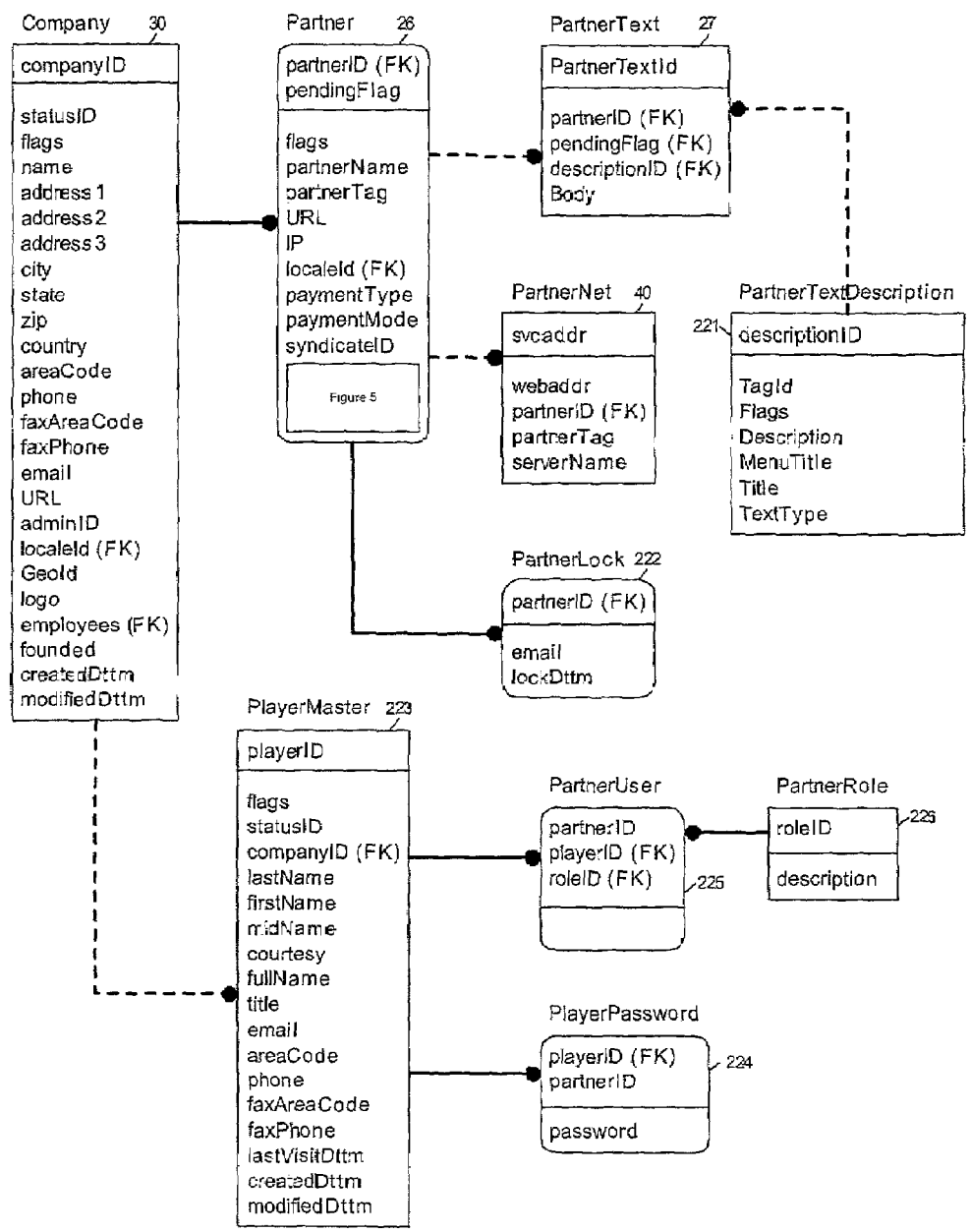
FIG. 22 illustrates the portion of the database schema designed to implement the SBS.

FIG. 22 illustrates the portion of the database schema designed to implement the SBS. When a partner joins the DSE network, a record is inserted into the Company table 30. The auto-generated companyID column is used as a unique identifier. To convert the company into a business partner—a new partner within the DSE network—two records are added to the Partner table 26 using the Company companyID value to populate the value of the Partner partnerID column. The pendingFlag column contains either 0 (the active record) or 1 (the pending record), allowing a maximum of two rows per partnerID. The active record is used in production. The PMT uses the pending record to provide a mechanism whereby the user can perform "what-if" scenarios. In effect, the pending record is a "sand-box", a temporary record in the Partner table, used to modify the PLI without affecting the production site.

Additionally, the Partner table 26 contains other configurable attributes. The partnerName column specifies a brief text description or title of the PLI. This is used to populate the title tag in the HTML header, which most browses display in the title bar of the windows management software installed on a Web user's computer. The partnerTag column is a unique key used to identify the partner and is typically the node name of the URL string. For example, given the URL "http://xyz.newmediary.com", the node name is "xyz". The URL column contains the fully qualified DNS string used to access the PLI, for example, "xyz.newmediary.com". The IP column specifies the external network (WAN) IP address—the numeric representation of the canonical DNS string.

Referring back to FIG. 5, this figure lists the remainder of fields in the Partner table. Most of these fields are used to brand the PLI. This list can be extended or condensed depending on the application requirements. Some applications utilize more distinct design elements than others. This list includes font family names, point sizes, foreground colors, and background colors. Other attributes include hyperlink and table formatting attributes.

Referring again to FIG. 22, the PartnerText table 27 contains large textual data describing HTML and text blocks. These text blocks are exposed within the PLI or as the content of automated system e-mail messages. By separating the textual content into its own table, this affords database administrators with the option of partitioning that data onto separate hard drives—a common practice to increase database performance and fault-tolerance. The descriptionID column links to the similarly named column of the PartnerTextDescription table 221. The PartnerTextDescription table 221 contains control information used to identify different record types allowed in the PartnerText table 27. This defines a catalog of text block types that each PLI can use. Only one instance of each text block type is allowed per PLI.

Also related to the Partner table is the PartnerNet table 40. This table consists of a unique svcaddr identity column used to specify the private (internal LAN) IP address of a Web server. The webaddr column specifies the public (external WAN) IP address of the PLI. The serverName column is a text description used to specify the name of the Web server computer. This table is responsible for maintaining information related to the mechanism of inferring and loading the appropriate PLI on a Web server. There should be a single record for each Web server on which a PLI is to run; a PLI can be load-balanced across Web servers.

The PartnerLock table 222 stores temporary, time-encoded markers that indicate if a single PLI is currently being edited. This prevents multiple users from editing the same PLI at the same time. When a user selects a PLI through the PMT, a record is inserted into the PartnerLock table. If a subsequent user attempt to choose the PLI from the PMT, the PartnerLock table is scanned for the existence of the partnerID; if found, the user is presented an error message and prevented from editing the PLI. When the first user logs out, or their user session times out, the temporary record is deleted, allowing subsequent users access to the PLI data.

For security, users are required to provide a username and password to access the Extranet PMT. The PlayerMaster table 223 describes user accounts. This table is used for both PMT account access and PLI access; each user who registers on a PLI is assigned a PlayerMaster record. The playerID column is a unique numeric identifier. The companyID column relates to a similar value in the Company table. The email column specifies the user's e-mail address and is used as the PMT account username. Since each PLI must be viewed as a natural and native extension of a PPS, separate passwords must be maintained for each PLI. The PlayerPassword table 224 is used to store these passwords and is uniquely identified by both the partnerID and the playerID.

Both the PlayerMaster email column and the PlayerPassword password column are used for account authentication. Account authorization is handled by the PartnerRole table 226 and the PartnerUser table 225. The Partner Role table defines PMT account associations. The PartnerUser table defines access control lists used to identify a combination of permissions, for example, a role that is assigned to an individual user. While each PLI user has a PlayerMaster record, PMT access is defined by the existence of a PartnerUser record. An account defined by the playerID column is granted access to edit the branding of a partner defined by the partnerID column. The roleID column defines the level of access granted to the user.

FIGS. 23A through 23E illustrate screen shots of the PMT. FIG. 23A shows the main page of the PMT after the user has authenticated. The dynamic toolbar 230 on the left is used to navigate the PMT Web site. The main body of this page 231 presents general configuration parameters for the PLI. These parameters all directly correlate to fields in the Partner table.

FIG. 23B shows the layout screen. The first section 232 of this screen is used to modify the geometry of the PLI, including the page width and the toolbar and tips column widths. The second section 233 is used to enable or disable the predefined user elements. The third section 234 is used to modify the placement of the predefined user interface elements. These elements include the toolbar—used to display personalized statistics, the tips column—used to display instructions, messages or advertising, and the about box—used to display content provided by the partner or the partner manager. The thumbnail diagram included in this section includes graphical elements representing the predefined user interface elements. Using the computer mouse, these graphics can be dragged to a different location within the diagram and dropped into place. This changes the placement of the element on the PLI. The save and revert buttons 235 are common on each page of the PMT and are used to save changes to the database or revert unsaved changes back to their prior state.

In FIG. 23C, the basic page styles are presented along with a form used to edit these styles. The form is divided into sections representing logical design elements, such as different font treatments. Many of the controls in this form allow the user to change colors 236, change font sizes 237, change font types 238, and apply special attributes 239, such as bold or italic treatments. As these values are changed, the Samples section 400 automatically changes its appearance to illustrate how the modifications will affect the PLI.

In addition to the graphic design treatments, the PMT also provides access to the customized text blocks stored in the PartnerText table. These text blocks are used to store snippets of HTML that are used to replace default content in predefined locations within the PLI. FIG. 23D illustrates the PMT screen used to edit these text blocks. This page is divided into two sections. The top section 401 contains a text editor used to edit the content of the text block. As changes are made, the user can press the update preview button 402. This copies the text block into the section bottom section 403. This section contains a graphical control that presents the text block as rendered HTML. This provides immediate feedback to the user without the need to publish the text block to the production environment. Once changes are completed, the user clicks the save button 404.

Referring to FIG. 23E, the user delegation screen provides a means by which users can be granted access to the PMT and assigned either predefined or customized roles. The e-mail field 405 is used to enter the e-mail address of a new user to add to the system. The user selection box 406 is used to select users that have already been added to the system. Once a user is specified or selected, roles and permissions can be customized for that user. The Role selection drop-down list 407 contains a list of predefined roles. These roles are associated with different combinations of the permissions 408. The permissions are directly associated with entries in the toolbar. Referring back to the FIG. 23A, the left-hand toolbar 230 is constructed by comparing each toolbar entry with its associated permission under the context of the current user. If the user has been granted permission to access that entry, then that entry is shown in the toolbar.

Brand Distribution Service

Web sites are generally distributed across multiple load-balanced computers to handle large volumes of traffic and provide a fault-tolerant environment. As computing power becomes less expensive, it becomes more cost effective to spread traffic across a large number of smaller computers, each with duplicate Web servers and source code. This approach also provides the smallest performance degradation in the event that one node fails in the load-balanced environment. However, this distributed environment presents its own technological challenge: When a brand configuration is updated, each Web server that hosts that PLI must be notified of those changes.

Once the PMT is used to modify the branding attributes of a PLI, it can be used to publish those modifications to the load-balanced Web servers. This is accomplished through a publishing module called the Brand Distribution Service (BDS). Referring again to FIG. 21, the PMT Extranet 211 includes a publish option accessible from the toolbar. This function first copies the branding attributes from the pending Partner record to the active Partner record. It then notifies a centralized BDS 213 that, in turn, prompts each PLI Web server 214 to refresh its OCM.

The system architecture relies on the assumption that each Web server computer is equipped with two Ethernet network interface cards: one is used to access the public Internet and is bound with a publicly routable IP address, and the other is used to access a private Intranet LAN and is bound with a private non-routable IP address. The private interface is used to gain database and systems management access.

Figure 24:
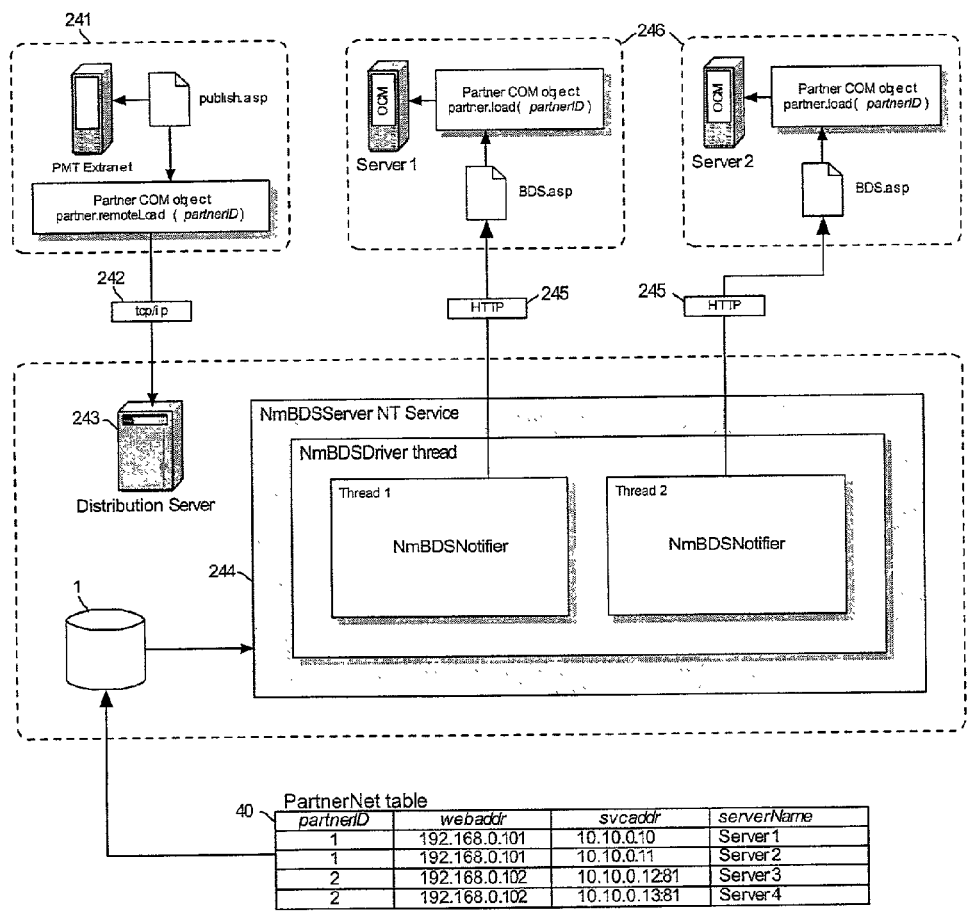
FIG. 24 illustrates an example of the contents of the PartnerNet table.

The BDS determines the network topology by reading it from the PartnerNet table. FIG. 24 illustrates an example of the contents of the PartnerNet table 40. The webaddr field specifies the publicly accessible IP address of the partner PLI. (The values shown here are only for the purpose of this example. Since the "192.168" subnet is non-routable, these values must be replaced with routable addresses in an actual deployment.) The svcaddr field specifies the internal, private IP address of each Web server. In this example, there are two distinct PLIs in this system. The partnerID and webaddr columns describe the public interface, while the svcaddr column defines the resources available for that public interface. In this example, PLI 1 is hosted on two Web servers with unique IP addresses, 10.10.0.1 and 10.10.0.2. Depending on the Web server software, it may be possible to host a PLI on an alternate port (standard HTTP is assigned to port 80). This example shows that PLI 2 is hosted on port 81 of server 10.10.0.3 and server 10.10.0.4. This allows multiple instances of the Web server to run on the same computer.

The BDS architecture illustrated in FIG. 24 demonstrates the distribution process. When a partner manager issues a publishing request through the PMT 241, the PMT calls the publish.asp page. This page instantiates a new Partner COM object and invokes the partner.remoteLoad() method. This method sends a message over TCP/IP 242, using a Socket interface, to a BDS Distribution server 243 located on the computer on the LAN. On the BDS Distribution server is a system process, such as an NT Service on Windows NT, called the NmBDSServer process 244. NmBDSServer contains one main thread—NmBDSDriver—that listens for incoming requests from the PMT. When a request is received, the NmBDSDriver thread fetches the network topology related to the client PLI Web server from the PartnerNet table 40 located in the centralized system database 1. In this example, PLI 1 is load-balanced across Server 1 and Server 2. NmBDSDriver builds a list of the svcaddr IP addresses for the PLI. The NmBDSDriver thread then instantiates a new thread of the NmBDSNotifier class for each of these servers, Thread 1 and Thread 2. This last thread layer is required to ensure a maximum success rate. Each thread targets a single remote Web server. If any server is unavailable then the thread will timeout, but will not affect the performance of the other threads in the system. These threads build HTTP requests 245 to the BDS.asp page on the remote servers 246. The BDS.asp page is a system page that is never accessed by normal Web users; only the NmBDSServer process on the BDS Distribution server invokes it. The BDS.asp page references the partner object, invoking partner.load() method, which reads a fresh copy of the active Partner record from the database 1 and sets all branding properties stored in the partner object.

Partner Branding Framework

The present invention provides a framework around which can be constructed a dynamic and flexible Web site branding programming model. The framework, known as the Partner Branding Framework (PBF), is comprised of encapsulation technologies based on the Web server software employed, programming objects used to encapsulate branding information, and a standard and simple template used as a foundation for all Web server pages.

The present invention employs the technologies available on the Windows NT 4.0 Server platform running Internet Information Server 4.0 (IIS). The technology specific to IIS is Active Server Pages (ASP). ASP includes two intrinsic objects: the Application object and the Session object. The Application object encapsulates information that is globally accessible to all users of IIS. It is instantiated exactly once on behalf of the first user to visit the Web server, and persists for the lifetime of that Web server. The Session object encapsulates information that is specific and local to a single user of IIS. A new and unique Session object is instantiated for and bound to each user, including the first, to visit the Web server.

The global.asa file is a customizable server configuration file specific to IIS. The present invention uses the global.asa file shown in FIG. 25. The global.asa file begins with directives 251 that implicitly declare two Application-level object references, NmEnums and partner. NmEnums is a container of static properties and constant values used throughout the application. The partner object implements both a persistent cache of PLI-specific information—including branding attributes and the OCM—and a set of methods used to format and convert that information into HTML.

Two of the standard IIS event handlers, Application_OnStart 252 and Session_OnStart 253, are utilized in the global.asa file. The Application_OnStart handler 252 contains code that initializes global application-level variables. For security and encapsulation, sensitive data, such as passwords, are stored in the Windows System Registry. The Wscript.Shell COM object is used to access this data. The matrix_DSN variable specifies the connection string used to access the database, such as a DSN string. The matrix_usrnam and matrix_passwd variables are the username and password used with the connection string to access the database.

The Session_OnStart handler 253 contains code to identify and load the PLI appropriate to the current Web server as defined in the PartnerNet table. This handler interrogates the values stored in the HTTP header. The IIS object model makes these values accessible by exposing the ServerVariables collection through the Request object. The HTTP_HOST attribute specifies the Web server URL or IP address; this is the portion of the request URL that follows the "http://" protocol specification and contains the node and domain names, for example "xyz.newmediary.com". The PATH_INFO attribute specifies the remainder of the URL immediately following the domain name; this equates to subdirectories or files resident on the Web server.

The objects declared by the initial directives 251 are not instantiated until they are explicitly referenced. The partner object is first referenced in the Session_OnStart handler. At this time, the partner.isInitialized() method returns false. The partner object needs to be initialized exactly once. Since the Session_OnStart event handler is invoked once for every new user session on the Web server, the initialized state of the partner object is used to prevent it from loading the PLI branding more than once. If partner.isInitialized() returns false, the partner.initialize() method is invoked, using the return value of the lookupPartner() function as the first parameter.

The lookupPartner() function 254 builds a SQL command to find the PLI partnerID value associated with the current Web server. The GetPartnerID stored procedure uses three tests to find the correct Partner record: If the requesting URL contains the canonical form of the Web site address, then that value would be found in the URL field of the Partner table; if the requesting URL contains the public IP address of the Web site, then that value would be found in the IP field of the Partner table; however, if the requesting URL contains the private local IP address of the Web server (for example a request coming from a back-end LAN for testing purposes) that IP address would be found in the svcadr field of the PartnerNet table.

If GetPartnerID returns a value greater than zero, then that value is returned by the lookupPartner() function. Otherwise, the function returns the default value NmEnums.NMID—the hard-coded value of the default Newmediary PLI. Although this may not be the correct PLI for this Web server, it guarantees that the application will initialize and load a viable branding.

As control returns to the Session_OnStart handler 253, the partner.initialize() method is invoked. Since the partner object is managed in the Application scope, it is sensible to use it to cache global information. The partner.initialize() method loads the taxonomy specific to the PLI and stores it in the NmCategoryCatalog object (the OCM). Then the PLI data is loaded, including all visual design attributes. Finally, the internal private Boolean property isInit is set to true; the value of this property is returned by the partner.isInitialized() method. Once this property is set to true, this property and the partner.isInitialized() method provide a mechanism that prevents the partner from reloading on subsequent session initializations.

Now that the partner branding information is loaded into the memory-resident cache, the PBF can generate Web pages using the customized PLI branding configuration. This is accomplished with a standard Web page template and two branding encapsulation objects: the partner object and the page object.

FIG. 26 illustrates the standard template for all Web pages in a PLI. The template first issues a Server Side Include (SSI) directive 261 to include the common.sct file. The common.sct script file declares references to the partner and page objects. The remainder of the template is comprised of three sections. In the first section 262 the page.openHeader() method is used to begin the HTML header block by writing out the <html> and <head> tags and writes header directives specific to the PLI, such as the <title> tag driven by the partner.name property. After this line, the programmer has the option of including additional header tags or client-side script blocks. The page.closeHeader() method ends the HTML header block by writing out the </head> tag. The page.start() method begins the body section of the page and generates the PLI header and, if present, the left column of the PLI.

The next section 263 provides a space for the programmer to add content to the Web page.

The final section 264 ends the page. The page.end() method produces the right column of the PLI—if required— and the PLI footer. Finally, this method writes out the </body> and </html> end tags.

Figure 27:
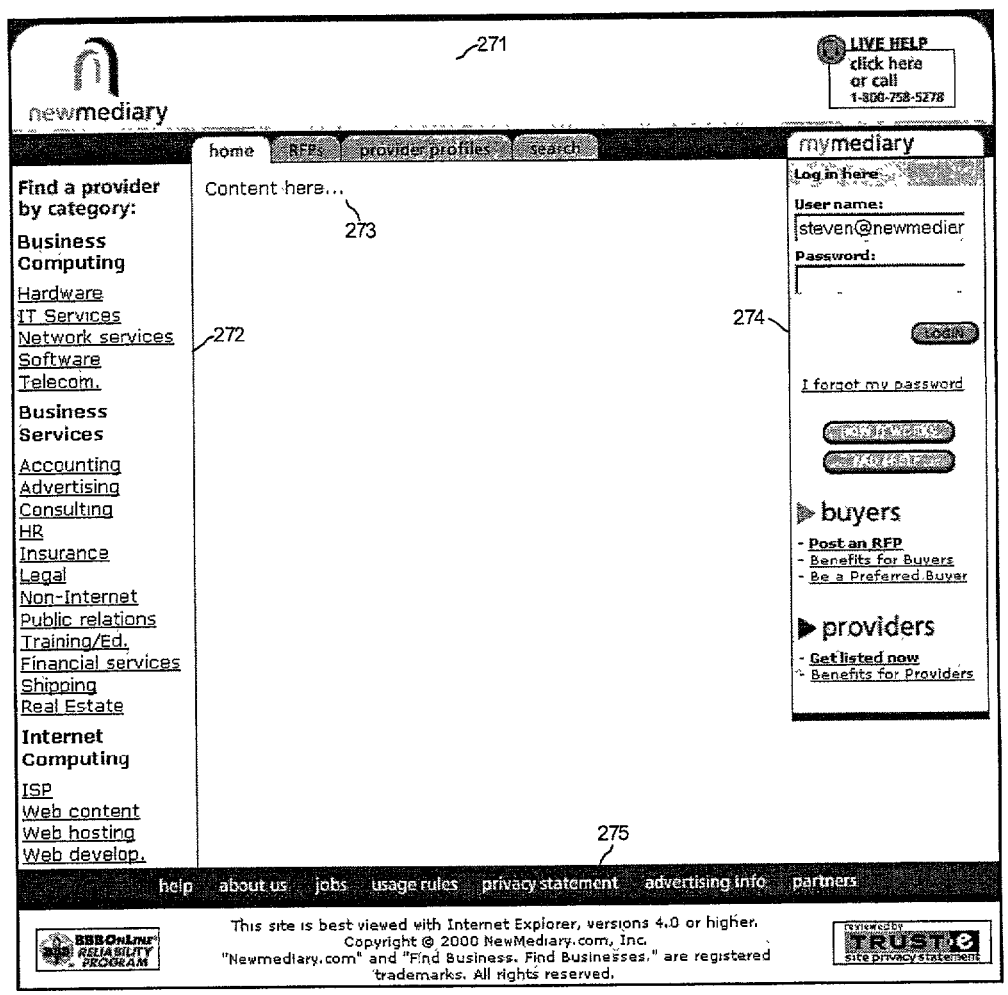
FIG. 27 illustrates the standard template produced by the code of FIG. 26.

The resultant page produced by this apparently simple template is shown in FIG. 27. The header text block 271 is shown at the top, including the site navigation bar. In this PLI, the tips column 272 is presented on the left side of the page. The center of the page 273 is reserved for page-specific content. The personalized toolbar 274 is presented on the right side of the page. And finally, the footer text block 275 is shown at the bottom.

Figure 28A:
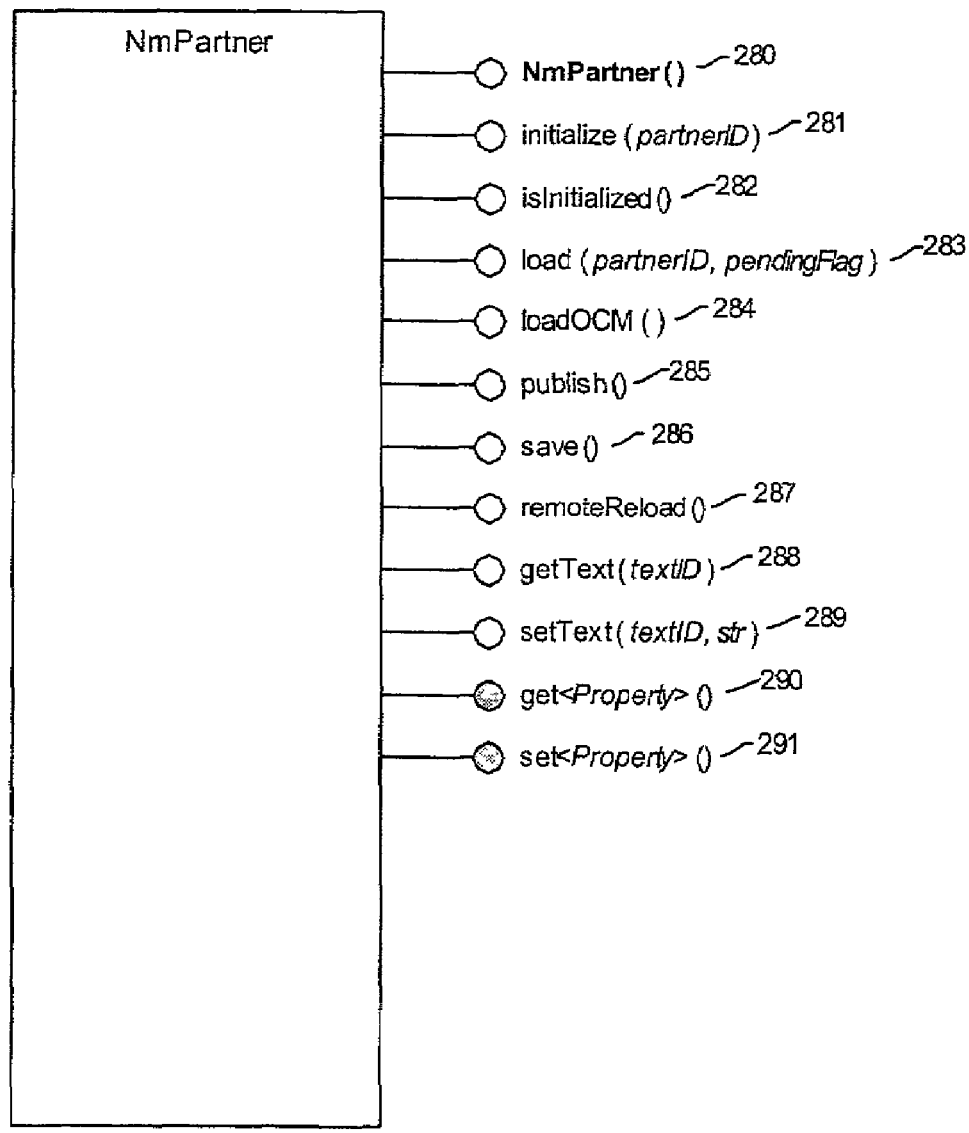
FIGS. 28A-B illustrate the Partner Branding Framework (PBF).
Figure 28B:
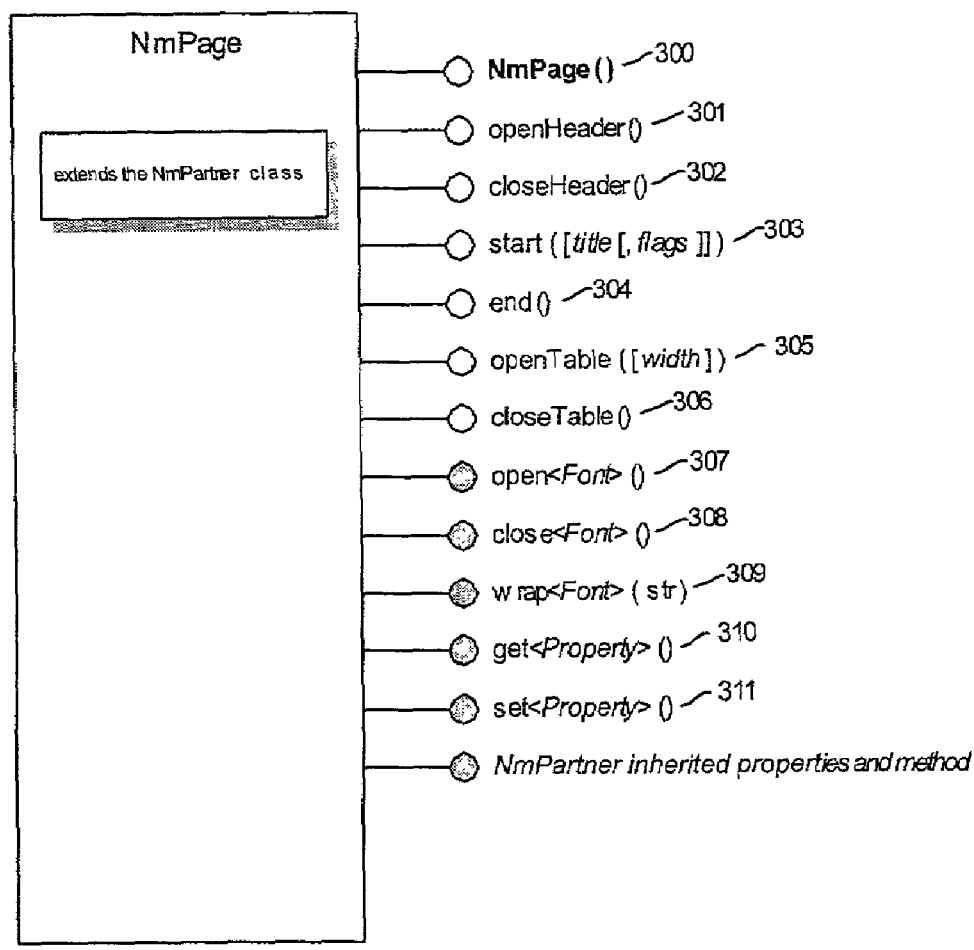

The PBF class interfaces are illustrated in FIGS. 28A and 28B. The partner object is derived from the NmPartner class shown in FIG. 28A. The NmPartner() constructor 280 initializes its public and private properties. The initialize() method 281 wraps both the load() method 283, which loads the branding attributes stored in the Partner table, and the loadOCM() method 284, which loads the Object Catalog statistics. The isInialize() method 282 returns a Boolean value: true if initialize() was invoked, false otherwise. The publish() method 285 copies the branding attributes from the pending Partner record to the active Partner record. The save() method 286 is used by the PMT to save changes to the pending Partner record. The remoteReload() method 287 notifies the BDS to signal remote Web servers to refresh their local partner objects.

The NmPartner class encapsulates an abstraction of the PartnerTextBlock table. The getText() method 288 is used to retrieve a value of a specified text block; the settext() method 289 is used to set the value of a specified text block.

The getText() method also incorporates a pre-parser that replaces pre-defined tokens with data values Referrring again to FIG. 23D, a content manager can use the PMT text block edit screen to embed tokens within HTML content. For example, it is a common practice to separate textual content serving from graphical content serving by deploying physically separated Web servers. In this case, the content must reference the URL of the graphics Web server. Since this URL may change over time, it is practical to store this URL in a global variable. The imgsrv variable is a constant string value, defined in the common.sct file, specifying the URL of an image server. FIG. 23D depicts a text block with the embedded token "<%=imgsrv%>". When that text block is requested using the get Text() method, the method first searches the text block for all pre-defined tags, such as "<%=imgsrv%<", and replaces those tags with the appropriate definitions, in this case the value of the imgsrv variable.

There are quite a few branding properties encapsulated by the NmPartner class. Each type of design element, manageable through the PMT, is represented internal by the NmPartner class and the Partner database table by multiple properties. For example, the page title font is represented by four fields: titleFg, titleType, titleSize, and titleFlag. These properties are wrapped by both "accessor" methods and "mutator" methods, for example, getTitleFg() and setTitleFg(). The get and set method templates, 290 and 291, shown in FIG. 28A represent the total set of these accessor and mutator methods.

The page object is derived from the NmPage class shown in FIG. 28B. The NmPage() constructor 300 initializes its public and private properties. The openHeader() method 301 and closeHeader() method 302 are used to open and close the HTML header block of a Web page. The start() method 303 and the endo method 304 are used to start and end the body of a Web page, including the header and left-hand column and the right-hand column and footer. The openTable() method 305 and the closeTable() method 306 are used to begin and end HTML tables. These methods encapsulate the basic geometry attributes of HTML tables, such as table width, border width and background colors.

The NmPage class is derived from the NmPartner class. It therefore inherits the plurality of font properties and accessor and mutator methods exposed by the NmPartner class. The NmPage class includes a number of methods that abstract these super-class methods, simply for convenience. The open, close, and wrap method templates, 307, 308, and 309, are used to generate various forms of the HTML font tag. For example, given a title font description such as "2pt, Black, Arial and Italic", the openTitleFont() method generates the HTML code: '<font size="2pt" color="black" type="Arial"><i>'. The closeTitleFont() method generates the code '</i></font>'. The wrapTitleFont() method incorporates both the openTitleFont() and closeTitleFont() methods. Give a string, such as "feather", this method produces: '<font size="2pt" color="black" type="Arial"><i>feather</i></font>'.

And similar to the NmPartner class, the NmPage class also includes get and set method templates, 310 and 311, for its own public and private properties.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An apparatus connecting buyers and sellers of products and services comprising:

a comprehensive directory of companies;

a user-maintained database of registered and subscribing companies selected from said comprehensive directory; and, service-brokering tools for interacting with said directory of companies and user-maintained database of companies, wherein said service-brokering tools comprise:

registering means for buyers and sellers to subscribe to the user-maintained database;

contacting means for buyers and sellers to contact subscribing members of the user-maintained database over a network;

searching means for said buyers and sellers to search said directory and said user-maintained database based on geographical boundaries, assigning means denoting a weighted importance to provider characteristics associated with each subscribing buyer and seller using object affiliations to indicate a level of presence each object is given in the directory, wherein the level of presence is based upon company profile, search result positioning and access to Requests for Proposals to afford each subscribing buyer and seller to be listed in multiple brands;

ordering means for ranking buyers and sellers according to said weighted importance of provider characteristics stored in the user-maintained database;

branding means for defining visual attributes, geometric layouts, graphical layouts, textual layouts, interface elements, and logical design elements that can be used to dynamically generate a branded Web site to afford each subscribing buyer and seller a different appearance across directories; and an internal mechanism for a Web server to infer a private label interface from an initial network request of a registered and subscribing company that can persist and cache said private label interface information for the Web server by loading taxonomies specific to individual user-maintained databases and specifying the location of a request for proposal by publishing a pending Partner record to an active record and informing servers within a qualified farm of load-balanced Web servers to re-load said active record in response to a posting of a new request in a qualified server's category.

2. The apparatus of claim 1, wherein said service-brokering tools further comprise objects that can be used to generate private label interface-specific HTML wherein the object specifies the location of a request for proposal.

3. The apparatus of claim 2, wherein said service-brokering tools further comprise a mechanism to synchronize partner information across said farm of load-balanced Web servers based upon the topology of the qualified farm, wherein the synchronized partner information comprises updated files incorporating the latest information independent of the server that supplies the information.

* * * * *